United States Patent
Nomura et al.

(10) Patent No.: US 8,294,871 B2
(45) Date of Patent: Oct. 23, 2012

(54) LIQUID CRYSTAL DISPLAY APPARATUS FORMING ASSEMBLY, LIQUID CRYSTAL CELL, AND LIQUID CRYSTAL DISPLAY APPARATUS, AND MANUFACTURING METHOD THEREOF

(75) Inventors: Naohiro Nomura, Kochi (JP); Kunihiko Kasuya, Nankoku (JP)

(73) Assignee: Casio Computer Co., Ltd., Tokyo (JP)

( * ) Notice: Subject to any disclaimer, the term of this patent is extended or adjusted under 35 U.S.C. 154(b) by 58 days.

(21) Appl. No.: 12/783,053

(22) Filed: May 19, 2010

(65) Prior Publication Data
US 2010/0225874 A1 Sep. 9, 2010

Related U.S. Application Data

(62) Division of application No. 11/879,158, filed on Jul. 16, 2007, now Pat. No. 7,768,623.

(30) Foreign Application Priority Data

Jul. 31, 2006 (JP) .................................. 2006-207601
Sep. 7, 2006 (JP) .................................. 2006-242475

(51) Int. Cl.
*G02F 1/1339* (2006.01)
(52) U.S. Cl. ......... 349/187; 349/153; 349/155; 349/190
(58) Field of Classification Search .................. 349/153, 349/155, 187, 190
See application file for complete search history.

(56) References Cited

U.S. PATENT DOCUMENTS

| | | | |
|---|---|---|---|
| 6,010,384 A | 1/2000 | Nishino et al. | |
| 6,099,672 A | 8/2000 | Yamazaki et al. | |
| 6,292,249 B1 * | 9/2001 | Kane et al. | 349/155 |
| 2005/0117106 A1 * | 6/2005 | Tatemura et al. | 349/153 |
| 2006/0152668 A1 * | 7/2006 | Jang et al. | 349/156 |

FOREIGN PATENT DOCUMENTS

| | | |
|---|---|---|
| JP | 2001-091956 A | 4/2001 |
| JP | 2003-075811 A | 3/2003 |
| JP | 2006-143506 A | 6/2006 |
| JP | 2007-298747 A | 11/2007 |

OTHER PUBLICATIONS

Japanese Office Action (and English translation thereof) dated May 13, 2008, issued in counterpart Japanese Application No. 2006-207601.
Japanese Office Action (and English translation thereof) dated May 27, 2008, issued in counterpart Japanese Application No. 2006-242475.

* cited by examiner

*Primary Examiner* — Michael Caley
(74) *Attorney, Agent, or Firm* — Holtz, Holtz, Goodman & Chick, PC

(57) ABSTRACT

A liquid crystal cell manufacturing method includes preparing a pair of glass substrates each including an area configured to form a plurality of finished liquid crystal display apparatuses thereon, while a plurality of seal members and a plurality of pillars each including ends that respectively abut against the pair of glass substrates are interposed between the pair of glass substrates, adhering the pair of glass substrates to form a liquid crystal display apparatus forming assembly, and while the liquid crystal display apparatus forming assembly is formed, forming a plurality of scribe lines that intersect each other on surfaces of the pair of glass substrates that are opposite to surfaces of the pair of glass substrates that oppose each other. At least a part of each of the pillars is arranged to overlap at least one of regions, between the pair of glass substrates, corresponding to the plurality of scribe lines.

4 Claims, 26 Drawing Sheets

FIG.7

| MEASUREMENT POINT | 21a | 21b | 21c | 21d | 21e | 21f | 21g |
|---|---|---|---|---|---|---|---|
| DISTANCE (mm) FROM RIGHT END FACE OF PILLAR | CENTRAL POINT | 0 | 0.3 | 0.5 | 0.6 | 1.0 | 2.0 |
| DEPTH (μm) OF SCRIBE LINE | 110 | 105 | 102 | 97 | 90 | 72 | 15 |
| OUTER SHAPE SIZE (mm) OF SCRIBE SURFACE | 3.97 | 3.97 | 3.97 | 3.97 | 3.97 | 3.97 | 3.97 |
| OUTER SHAPE SIZE (mm) OF COUNTER-SCRIBE SURFACE | 3.99 | 3.988 | 3.97 | 3.95 | 3.94 | 3.88 | 3.83 |
| ERROR (mm) IN OUTER SHAPE | −0.02 | −0.018 | ±0 | 0.02 | 0.03 | 0.09 | 0.14 |

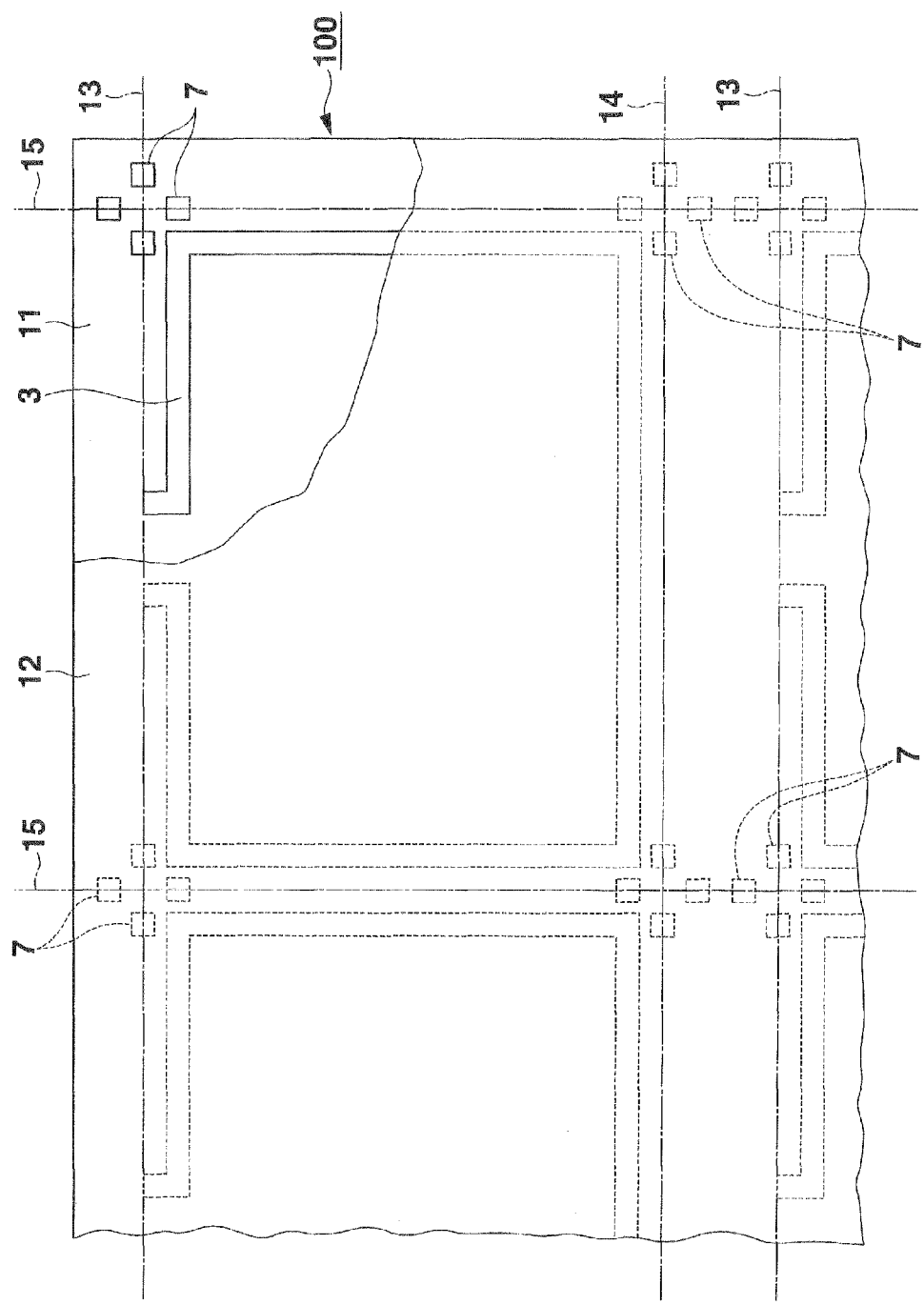

LIQUID CRYSTAL DISPLAY APPARATUS FORMING ASSEMBLY, LIQUID CRYSTAL CELL, AND LIQUID CRYSTAL DISPLAY APPARATUS, AND MANUFACTURING METHOD THEREOF

CROSS-REFERENCE TO RELATED APPLICATIONS

The present application is a Divisional application of U.S. application Ser. No. 11/879,158 filed Jul. 16, 2007 now U.S. Pat. No. 7,768,623, which is based upon and claims the benefit of priority from prior Japanese Patent Applications No. 2006-207601, filed Jul. 31, 2006; and No. 2006-242475, filed Sep. 7, 2006, the entire contents of both of which are incorporated herein by reference.

BACKGROUND OF THE INVENTION

1. Field of the Invention

The present invention relates to a liquid crystal display apparatus forming assembly, a liquid crystal cell, and a liquid crystal display apparatus, and a manufacturing method thereof.

2. Description of the Related Art

According to one conventional method of manufacturing a liquid crystal cell and a liquid crystal display apparatus, two large glass substrates, each having such an area that finished liquid crystal display apparatuses can be formed thereon, are adhered to each other through almost square seal members interposed between them, thus forming a liquid crystal display apparatus forming assembly. The liquid crystal display apparatus forming assembly is cut along scribe lines formed on its respective outer surfaces in the column direction and row direction, thus forming liquid crystal cells. A polarizing plate is adhered to the liquid crystal cells, and a driving circuit is mounted on the liquid crystal cells, thus obtaining liquid crystal display apparatuses. Such a method is disclosed in, for example, Jpn. Pat. Appln. KOKAI Publication No, 2006-143506. In this case, that surface of one of the two substrates included in each liquid crystal cell which opposes the other substrate has scanning signal lines, data signal lines, thin film transistors, pixel electrodes, an alignment film, and the like. That surface of the other substrate which opposes the first substrate has a color filter, an alignment film, and the like. The two substrates adhere to each other through the seal member. A liquid crystal is sealed between the two substrates.

When cutting the liquid crystal display apparatus forming assembly, first, using a scriber, scribe lines are formed on those two surfaces of the respective surfaces of the pair of glass substrates included in the liquid crystal display apparatus forming assembly, which are located on the outer side. Due to the structure of the liquid crystal display apparatus forming assembly, no scribe lines can be formed on two inner surfaces of the pair of glass substrates. Accordingly, when cutting the liquid crystal display apparatus forming assembly, the accuracy of the shape on each surface located on the outer side may differ from that of the shape on each surface located on the inner side corresponding to the outer surface. In such a case, the cut end faces of the glass substrates are not perpendicular to the surfaces of the glass substrates and obliquely break undesirably. At a portion where a scribe line in the row direction and a scribe line in the column direction intersect, the end faces of the glass substrates are comparatively larger than in the other portions and are not perpendicular to the surfaces of the glass substrates and obliquely break easily. This forms a comparatively large burr to cause an obstacle when building a resultant liquid crystal display apparatus in an electronic device.

BRIEF SUMMARY OF THE INVENTION

According to an aspect the present invention, there is provided a liquid crystal cell manufacturing method comprising:

preparing a pair of glass substrates each including an area configured to form a plurality of finished liquid crystal display apparatuses thereon;

while a plurality of seal members and a plurality of pillars each including ends that respectively abut against the pair of glass substrates are interposed between the pair of glass substrates, adhering the pair of glass substrates to form a liquid crystal display apparatus forming assembly; and while the liquid crystal display apparatus forming assembly is formed, forming a plurality of scribe lines that intersect each other on surfaces of the pair of glass substrates that are opposite to surfaces the pair of glass substrates that oppose each other, wherein at least a part of each of the pillars is arranged to overlap one of regions, between the pair of glass substrates, corresponding to the scribe lines.

According to another aspect of the present invention, there is provided a liquid crystal display apparatus manufacturing method comprising:

preparing a pair of glass substrates each including an area configured to form a plurality of finished liquid crystal display apparatuses thereon;

while a plurality of seal members and a plurality of pillars each including ends that respectively abut against the pair of glass substrates are interposed between the pair of glass substrates, adhering the pair of glass substrates to form a liquid crystal display apparatus forming assembly; and while the liquid crystal display apparatus forming assembly is formed, forming a plurality of scribe lines that intersect each other on surfaces of the pair of glass substrates that are opposite to surfaces of the pair of glass substrates that oppose each other, wherein at least a part of each of the pillars are arranged to overlap one of regions, between the pair of glass substrates, corresponding to the scribe lines.

According to still another aspect of the present invention, there is provided a liquid crystal display apparatus forming assembly comprising:

a pair of glass substrates each including an area configured to form a plurality of finished liquid crystal display apparatuses thereon;

a plurality of seal members interposed between the pair of glass substrates; and a plurality of pillars each including ends that respectively abut against the pair of glass substrates, wherein at least a part of each of the pillars is provided to include one of regions, between the pair of glass substrates, corresponding to the scribe lines that intersect each other on surfaces of the pair of glass substrates that are opposite to surfaces of the pair of glass substrates that oppose each other.

According to still another aspect of the present invention, there is provided a liquid crystal cell comprising:

a pair of glass substrates;

a seal member interposed between the pair of glass substrates; and at least one pillar including ends that respectively abut against the pair of glass substrates, wherein at least one of the at least one pillar is provided at least one region corresponding to one of the ends of the glass substrates on at least one of the glass substrates.

According to still another aspect of the present invention, there is provided a liquid crystal display apparatus comprising:

a pair of glass substrates;

a seal member interposed between the pair of glass substrates; and at least one pillar including ends that respectively abut against the pair of glass substrates, wherein at least one of the at least one pillar is provided at least one region corresponding to one of the ends of the pair of glass substrates on at least one of the pair of glass substrates.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7 is a table to explain measurement results obtained at respective measurement points shown in FIG. 6;

FIG. 12 is an enlarged plan view, similar to FIG. 3, to explain an example of a manufacturing method according to the fourth embodiment of the present invention;

DETAILED DESCRIPTION OF THE INVENTION

First Embodiment

Figure 1A:
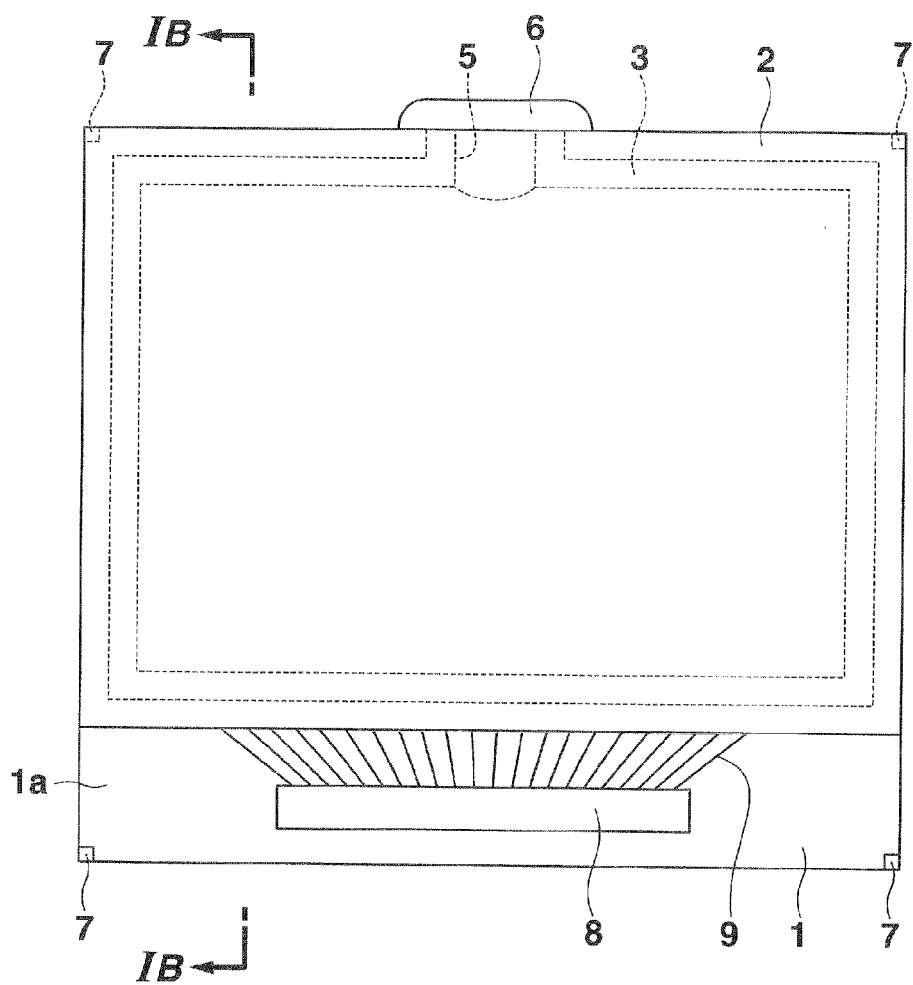
FIG. 1A is a plan view of an example of a liquid crystal display apparatus that is manufactured by a manufacturing method according to the first embodiment of the present invention.
Figure 1B:
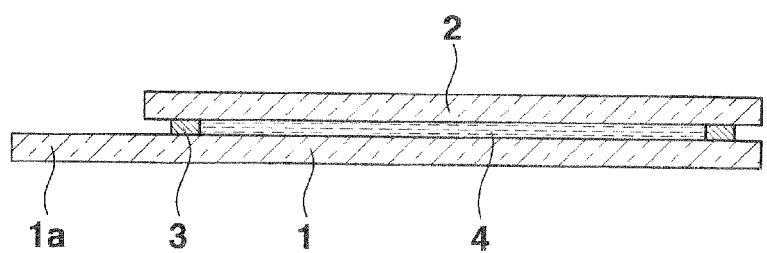
FIG. 1B is a sectional view taken along the line IB-IB of FIG. 1A.

FIG. 1A is a plan view of an example of a liquid crystal display apparatus that is manufactured by a manufacturing method according to the first embodiment of the present invention, and FIG. 1B is a sectional view taken along the line IB-IB of FIG. 1A. In FIG. 1B, wiring lines 9 to be described later are not illustrated. In this liquid crystal display apparatus, a first glass substrate 1 and a second glass substrate 2 that is arranged above the first glass substrate 1 to oppose it are adhered to each other through an almost square seal member 3. A liquid crystal 4 is filled between the two glass substrates 1 and 2 inside the seal member 3 through a liquid crystal filling hole 5 formed in the seal member 3. A sealant 6 seals the liquid crystal filling hole 5.

In this case, the lower side of the first glass substrate 1 in FIG. 1A projects from the second glass substrate 2. That portion of the first glass substrate 1 which projects from the second glass substrate 2 is called a projection 1a. A driving circuit 8 is mounted on the upper surface of the projection 1a. Thin film transistors, pixel electrodes, and the like (not shown), and the wiring lines 9, e.g., gate lines and drain lines, to drive the film transistors, pixel electrodes, and the like are formed on the upper surface of the first glass substrate 1. The wiring lines 9 lead to the projection 1a. One end of each wiring line 9 forms a connection terminal to electrically connect to a corresponding output terminal of the driving circuit 8. The respective input terminals of the driving circuit 8 are electrically connected to the connection terminals of input wiring lines (not shown) formed on the upper surface of the first glass substrate 1. Pillars 7, each of which has an almost square shape when seen from the top and two ends abutting against the glass substrates 1 and 2, are arranged between the two corners (ends) of the upper side of the second glass substrate 2 in FIG. 1A and the first glass substrate 1. Pillars 7, each of which has an almost square shape when seen from the top, are formed on the upper surfaces of the two corners (ends) of the lower side of the projection 1a of the first glass substrate 1.

An example of a method of manufacturing this liquid crystal display apparatus will be described with reference to the manufacturing process flowchart shown in FIG. 2. First, in step S1 (prepare two large glass substrates) of FIG. 2, two large glass substrates 11 and 12, each having such an area that (e.g., 3×3=9) finished liquid crystal display apparatuses can be formed thereon, as shown in FIG. 3, are prepared. Thin film transistors, pixel electrodes, and the like (not shown) are formed on one surface of the first large glass substrate 11, and common electrodes (not shown) and the like are formed on one surface of the second large glass substrate 12. Regions surrounded by one-dot dashed lines 13 and 15 (to be described later) are liquid crystal display apparatus forming regions 16. Of regions surrounded by the one-dot dashed lines 13 and 15 and one-dot dashed lines 14, those where no seal members 3 are provided are projection (1a) forming regions 17. No extra regions are formed between the liquid crystal display apparatus forming regions 16 that are adjacent to each other in the row direction and column direction.

Figure 2:
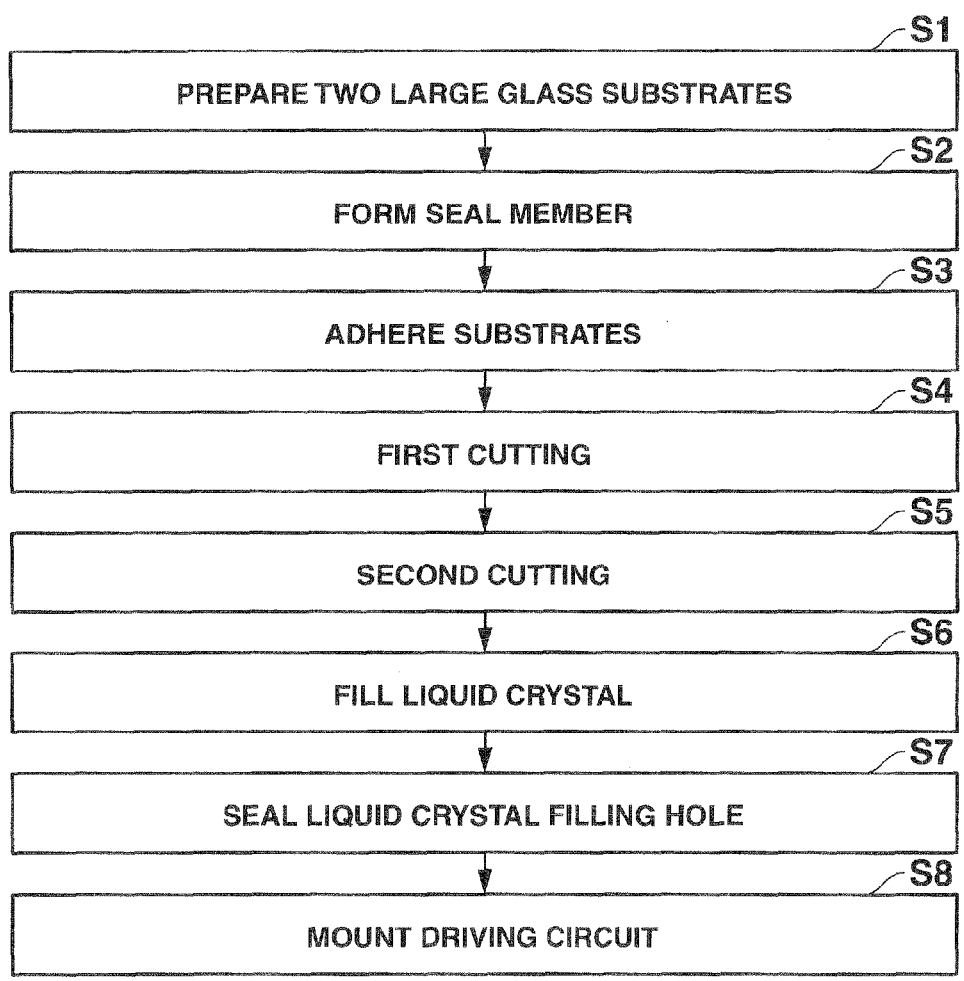
FIG. 2 is a flowchart showing a process of manufacturing the liquid crystal display apparatus shown in FIGS. 1A and 1B.
Figure 3:
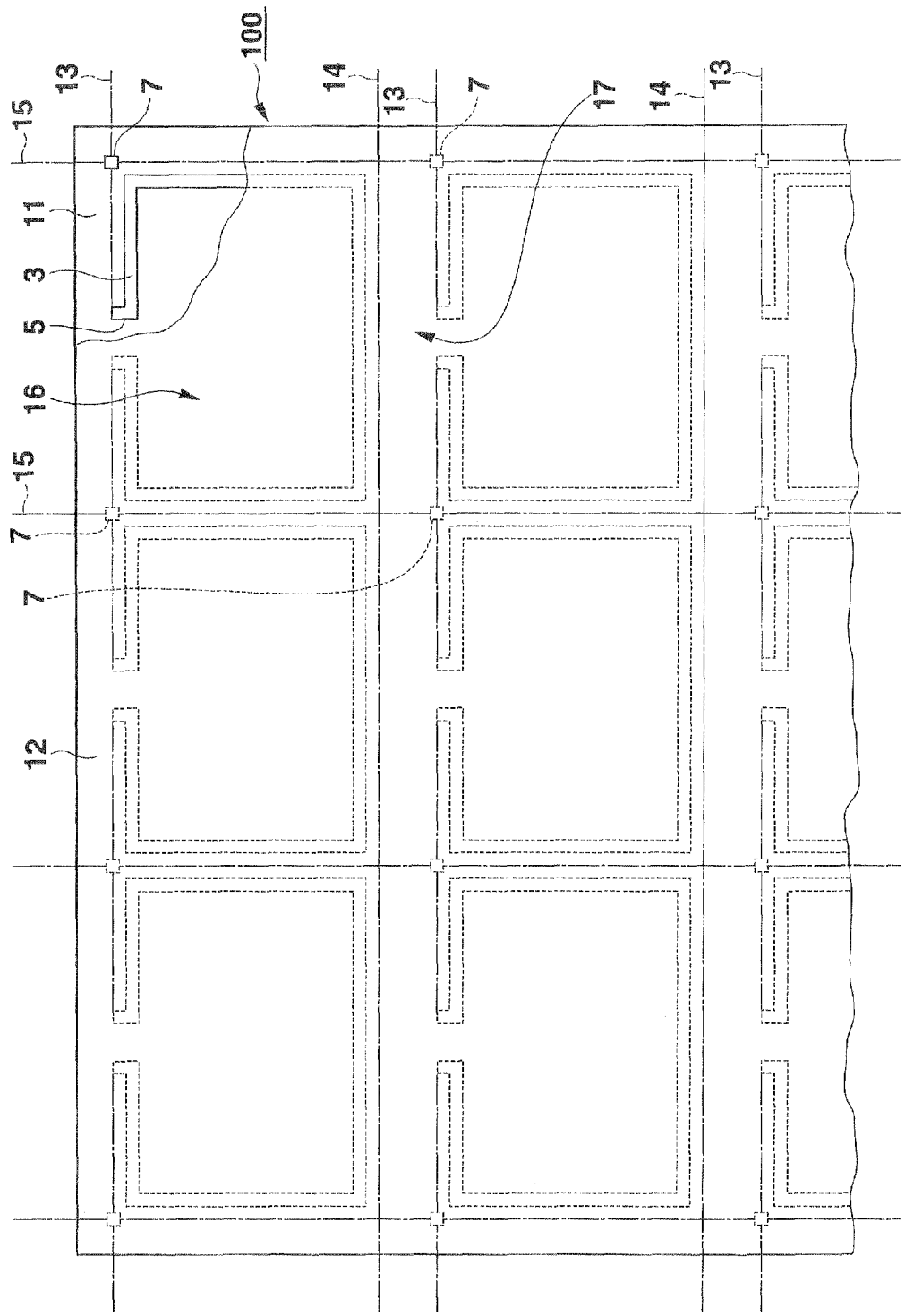
FIG. 3 is a partially cutaway plan view in which first and second large glass substrates are partially cut away to explain steps S1 to S5 in FIG. 2.

In step S2 (form seal member) of FIG. 2, the almost square frame-like seal member 3 made of a thermosetting epoxy-based resin or the like is formed within each liquid crystal display apparatus forming region 16 on one surface of the first large glass substrate 11 by screen printing, a dispenser method, or the like to surround a region excluding the corresponding projection forming region 17. Simultaneously, the pillars 7, each of which has an almost square shape when seen from the top and is made of a thermosetting epoxy-based resin or the like, are provided at the four corners (ends) of each liquid crystal display apparatus forming region 16 on one surface of the first large glass substrate 11. The liquid crystal filling hole 5 is formed in one portion of the seal member 3.

Subsequently, in step S3 (adhere substrates) of FIG. 2, the first and second large glass substrates 11 and 12 prepared in step S1 are arranged through the seal members 3 and pillars 7 so that one surface of the first large glass substrate 11 opposes one surface of the second large glass substrate 12. The seal members 3 and pillars 7 are heated and set so that the two large glass substrates 11 and 12 adhere to each other through them. In the following description, the assembly including the two large glass substrates 11 and 12 that are adhered in this manner will be referred to as a liquid crystal display apparatus forming assembly 100.

In FIG. 3, the one-dot dashed lines extending in the row directions along the respective distal ends of the liquid crystal filling holes 5 of the seal members 3 are first scribe line virtual lines 13. The one-dot dashed lines extending in the row directions along the outer sides of the respective lower sides of the seal members 3 are second scribe line virtual lines 14. The one-dot dashed lines extending in the column directions along the respective left sides or right sides of the seal members 3 are third scribe line virtual lines 15. As will be described later, scribe lines are formed, on that other surface of the first large glass substrate 11 and that other surface of the second large glass substrate 12, constituting the outer surfaces of the liquid crystal display apparatus forming assembly 100, which are opposite to the surfaces that oppose each other, each along any one of the scribe line virtual lines 13, 14, and 15.

The pillars 7 are interposed between the two large glass substrates 11 and 12 at portions corresponding to the intersections of the first scribe line virtual lines 13 extending in the row directions and the third scribe line virtual lines 15 extending in the column directions. The two ends of each pillar 7 abut against the first and second large glass substrates 11 and 12, respectively. In this case, the planar size of the pillar 7 is larger than the planar size of the region where the scribe line formed along the first scribe line virtual line 13 extending in the row direction and the scribe line formed along the third scribe line virtual line 15 extending in the column direction intersect. For example, the planar size of the pillar 7 is 0.3 mm×0.3 mm. As will be described later, each scribe line formed along the first or third scribe line virtual line has a width of approximately 20 μm. The first and third scribe line virtual lines 13 and 15 extend through the central point of the corresponding pillar 7.

In step S4 (first cutting) of FIG. 2, while the liquid crystal display apparatus forming assembly 100 shown in FIG. 3 is turned over, using a scriber, the first and third scribe lines are formed on the outer surface of the first large glass substrate 11, which is located on the upper side, along the first and third scribe line virtual lines 13 and 15. Then, the liquid crystal display apparatus forming assembly 100 is turned over. An external force is applied to the first and third scribe line portions of the first large glass substrate 11 through the seal members 3 and the like by, e.g., pressurizing the upper surface of the second large glass substrate 12 that is located on the upper side, or applying an impact to this upper surface, to cut the first large glass substrate 11, which is located on the lower side, along the first and third scribe lines.

In step S5 (second cutting) of FIG. 2, using a scriber, the first, second, and third scribe lines are formed on the outer surface of the second large glass substrate 12, which is located on the upper side, along the first, second, and third scribe line virtual lines 13, 14, and 15. Then, the liquid crystal display apparatus forming assembly 100 is turned over. An external force is applied to the first, second, and third scribe line portions of the second large glass substrate 12 through the seal members 3 and the like by, e.g., pressurizing the upper surface of the first large glass substrate 11 that is located on the upper side, or applying an impact to this upper surface, to cut the second large glass substrate 12, which is located on the lower side, along the first, second, and third scribe lines.

Figure 4:
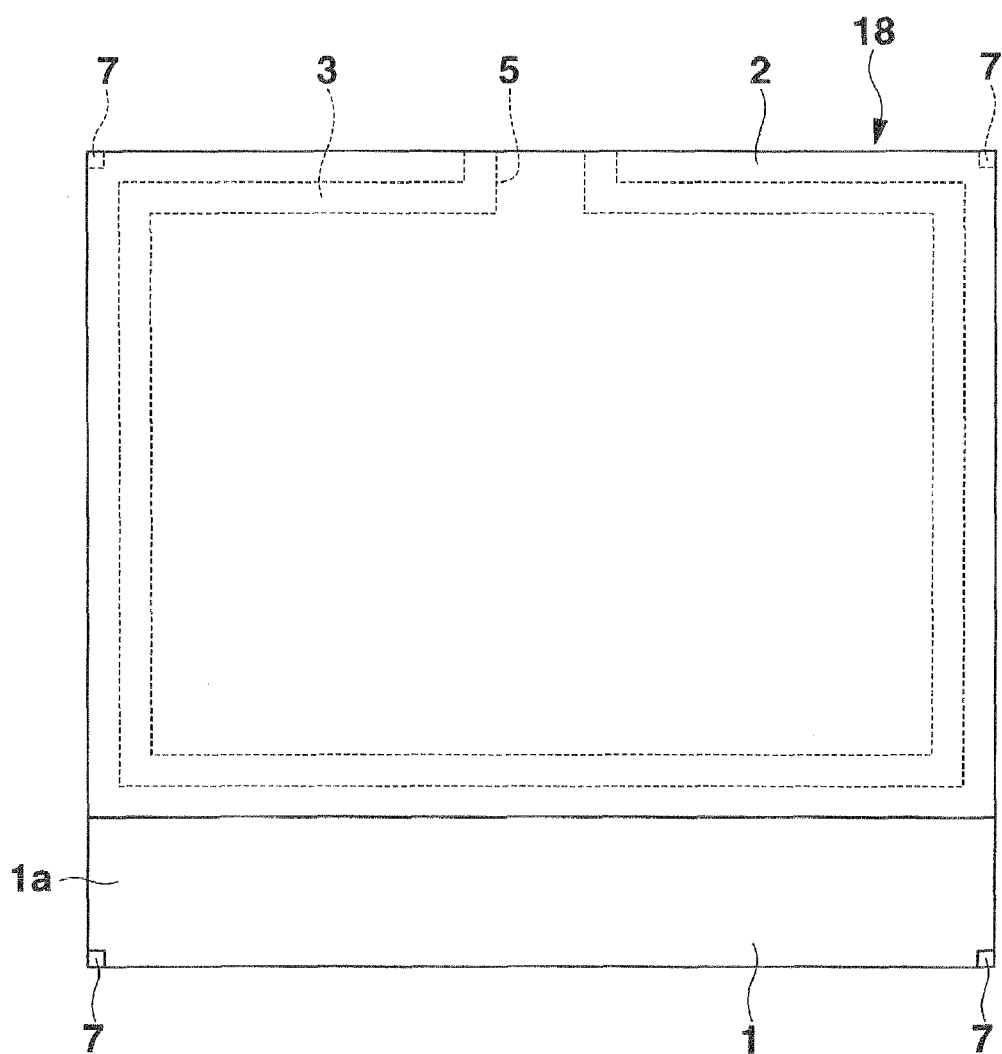
FIG. 4 is a plan view of a liquid crystal cell that is obtained by step S5 (second cutting) in FIG. 2.

Hence, nine liquid crystal cells 18 each shown in FIG. 4 are obtained. In this state, of each second large glass substrate 12, the portion corresponding to the projection forming region 17 (the region between the first and second scribe line virtual lines 13 and 14 shown in FIG. 3) is removed to expose the projection 1a of the first glass substrate 1. The pillars 7 are cut together with the two large glass substrates 11 and 12 to each form a cross when seen from the top. The pillars 7, each having an almost square shape when seen from the top, remain between the two corners (ends) of the upper side of the second glass substrate 2 in FIG. 4 and the first glass substrate 1. The pillars 7, each having an almost square shape when seen from the top, remain on the upper surfaces of the two corners (ends) of the lower side of the projection 1a of the first glass substrate 1. The function of the pillars 7 will be described later.

In step S6 (fill liquid crystal) of FIG. 2, a liquid crystal (not shown) is filled between the two glass substrates 1 and 2 inside the seal member 3 of the liquid crystal cell 18 through the liquid crystal filling hole 5 of the seal member 3. Subsequently, in step S7 (seal liquid crystal filling hole) of FIG. 2, the photo-setting sealant 6 (see FIG. 1A) is provided at the liquid crystal filling hole 5 of the seal member 3 of the liquid crystal cell 18, and is set by light such as ultraviolet rays to seal the liquid crystal filling hole 5. In step S8 (mount driving circuit) of FIG. 2, a polarizing plate is adhered to the liquid crystal cell, and a driving circuit is mounted on the liquid crystal cell. Thus, the liquid crystal display apparatus shown in FIGS. 1A and 1B can be obtained.

Figure 5:
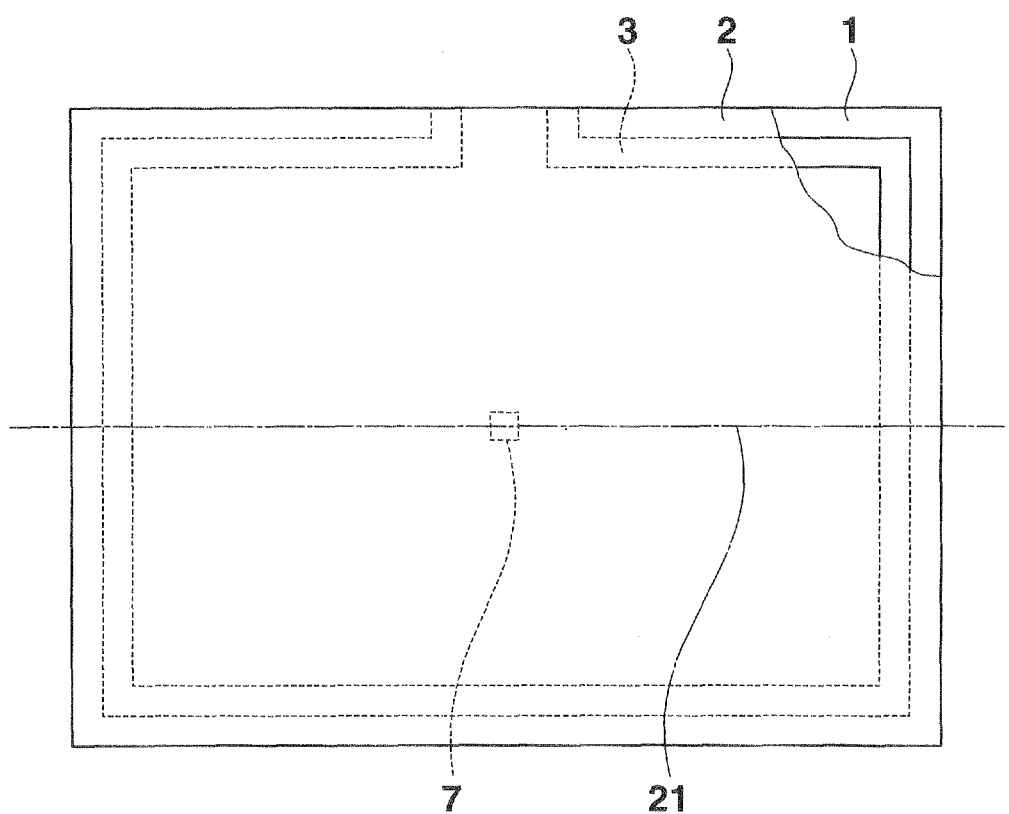
FIG. 5 is a partially cutaway plan view showing an experimental liquid crystal display apparatus.

The function of the pillars 7 will be described using the experimental results shown in FIG. 7. First, a structure obtained by adhering two glass substrates 1 and 2 through a seal member 3 and a pillar 7 was prepared, as shown in FIG. 5. The two glass substrates 1 and 2 have the same planar sizes, and the pillar 7 is arranged at one central portion between the two glass substrates 1 and 2. The two glass substrates 1 and 2 were cut along a scribe line 21 formed on the respective outer surfaces, as indicated by a one-dot dashed line in FIG. 5 extending in the row direction through the central point of the pillar 7. Each of the first and second glass substrates 1 and 2 had a thickness of 0.5 mm. The pillar 7 had a planar size of 0.3 mm×0.3 mm. The scribe line 21 had a width of approximately 20 μm.

Figure 6:
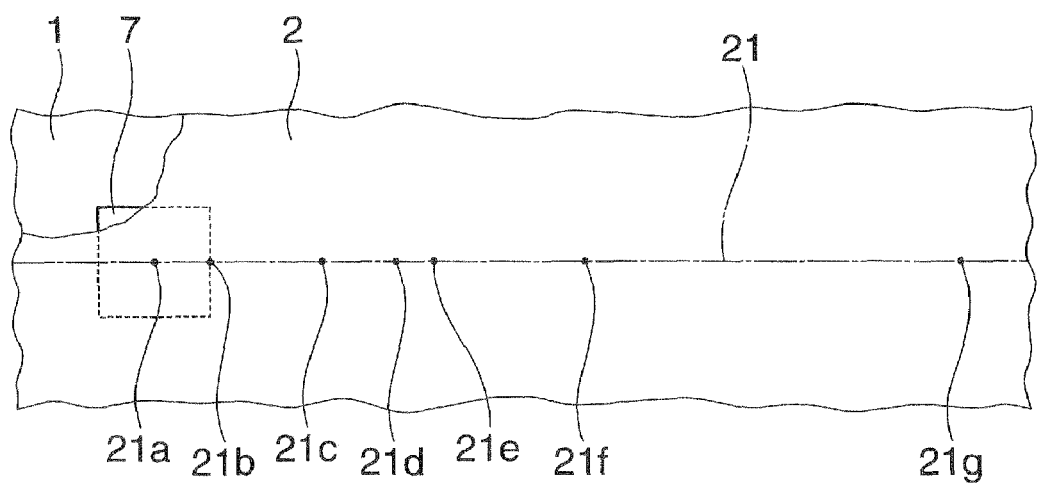
FIG. 6 is a partially cutaway plan view in which a pillar is partially cut away to explain cutting of the liquid crystal display apparatus shown in FIG. 5.

The cut surface of the first glass substrate 1 was examined at a central point 21a of the pillar 7, a point 21b located on the right end face of the pillar 7, and points 21c, 21d, 21e, 21f, and 21g that were spaced apart from the right end face of the pillar 7 by 0.3 mm, 0.5 mm, 0.6 mm, 1.0 mm, and 2.0 mm, respectively, on the scribe line 21 as indicated by black dots in FIG. 6. The results shown in FIG. 7 were obtained.

In FIG. 7, the "outer shape size of scribe surface" refers to, on that surface of the first glass substrate 1 which is opposite to the surface opposing the second glass substrate 2, the distance from the outer side of the lower side of the seal member 3 shown in FIG. 5 to the cutting surface. The "outer shape size of counter-scribe surface" refers to, on that surface of the first glass substrate 1 which opposes the second glass substrate 2, the distance from the outer side of the lower side of the seal member 3 shown in FIG. 5 to the cutting surface. The "error in outer shape" refers to a value obtained by subtracting the outer shape size of the counter-scribe surface from the outer shape size of the scribe surface described above.

As is apparent from FIG. 7, the depth of the scribe line 21 is deepest with 110 μm at the central point 21a of the pillar 7, and gradually decreases to be smaller the farther away from the central point 21a, to 97 μm that is less than 100 μm at the point 21d spaced apart from the right end face of the pillar 7 by 0.5 mm, 90 μm at the point 21e spaced apart by 0.6 mm, 72 μm at the point 21f spaced apart by 1.0 mm, and as extremely small as 15 μm at the point 21g spaced apart by 2.0 mm.

The outer shape size of the scribe surface is constantly 3.97 mm regardless of the depth of the scribe line 21. This is because the cutting surface on the outer surface of the first glass substrate 1 is linear so it conforms to the scribe line 21 formed on the outer surface. In contrast to this, the outer shape size of the counter-scribe surface varies, showing that the depth of the scribe line 21 influences it.

The error in outer shape is ±0 mm at the point 21c spaced apart from the right end face of the pillar 7 by 0.3 mm, negative (−0.02 mm, −0.018 mm) on the left side of the point 21c, and positive (0.02 mm, 0.03 mm, 0.09 mm, 0.14 mm) on the right side of the point 21c, gradually increasing to be larger the more to the right side. If the error in outer shape is equal to 0.02 mm or less, it scarcely causes an obstacle when building a resultant liquid crystal display apparatus into an electronic device. Thus, it can be regarded that the frequency that the end face of the glass substrate after cutting is not perpendicular to the surface of the glass substrate but breaks obliquely to lead to a defective outer shape can be suppressed. Particularly, it can be regarded that, at a corner (end) of the glass substrate, the frequency that the end face of the glass substrate after cutting is comparatively larger than at the other portions and breaks obliquely to the surface of the glass substrate, or forms a comparatively large burr, to lead to a defective outer shape, can be suppressed.

More specifically, concerning the error in outer shape, it is regarded that the frequency of the defective outer shape can be suppressed at the central point 21a (−0.02 mm) of the pillar 7, the point 21b (−0.018 mm) passing through the right end face of the pillar 7, the point 21c (±0 mm) spaced apart from the right end face of the pillar 7 by 0.3 mm, and the point 21d (0.02 mm) spaced apart from the right end face of the pillar 7 by 0.5 mm. However, it is not regarded that the frequency of the defective outer shape can be suppressed at the point 21e (0.03 mm), point 21f (0.09 mm), and point 21g (0.14 mm) spaced apart from the right end face of the pillar 7 by 0.6 mm, 1.0 mm, and 2.0 mm, respectively. Thus, in order to suppress the frequency of the defective outer shape, the pillar 7 may be formed in the vicinity, e.g., in a region within 0.05 mm, of a portion where a defective outer shape tends to occur.

Based on the above experimental results, in the liquid crystal display apparatus forming assembly 100 shown in FIG. 3, assume that the pillars 7 were provided at portions corresponding to the intersections of the first and third scribe line virtual lines 13 and 15, where the frequency of the defective outer shape was conventionally high, as in the liquid crystal display apparatus according to the first embodiment described above. Then, at the four corners (ends) of the first glass substrate 1 shown in FIG. 4 that was obtained by cutting the liquid crystal display apparatus forming assembly 100, the frequency of the defective outer shape could be suppressed. Simultaneously, at the two corners (ends) of the upper side of the second glass substrate 2 shown in FIG. 4, the same effect as that obtained at the four corners (ends) of the first glass substrate 1 described above could be obtained.

This was probably because the scribe strength became stable at the portion corresponding to the intersection of the first and third scribe line virtual lines 13 and 15, and because the depths of the scribe lines formed at this portion could be made deeper (110 μm at the central point of the pillar 7 and 105 μm at the end face of the pillar 7) than a predetermined depth (97 μm).

More specifically, when observed microscopically, the scribe lines are steps formed on the outer surfaces of the first and second large glass substrates 11 and 12. At the portion where the scribe lines intersect, when forming the second scribe line to intersect the first scribe line that was formed first, the scriber rides over the steps corresponding to the first scribe line. The pressure with which the scriber presses the outer surface of the glass surface described above becomes unstable, and the pressure with which the scriber presses the outer surface of the glass substrate tends to decrease. The scribe lines formed in such a portion tend to be shallower than at the other portions. Thus, at the portion where the scribe lines intersect, the frequency of the defective outer shape may be higher than at the other portions.

Second Embodiment

Figure 8:
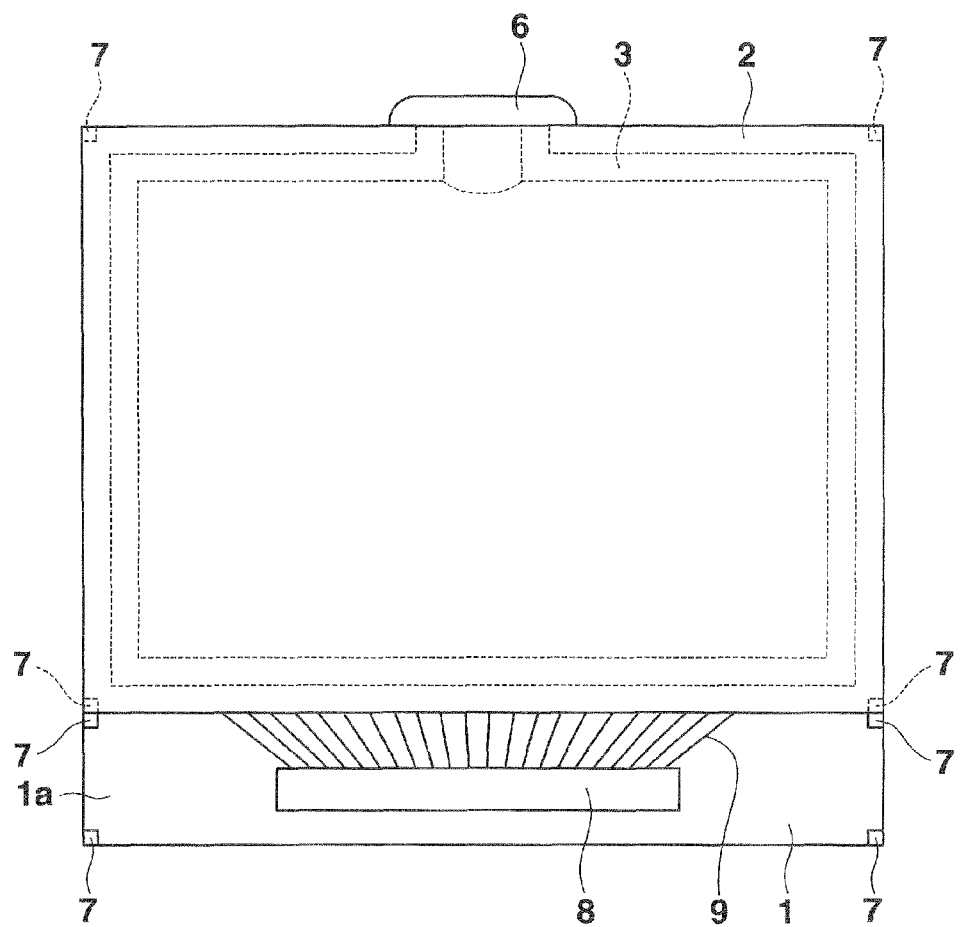
FIG. 8 is a plan view of an example of a liquid crystal display apparatus that is manufactured by a manufacturing method according to the second embodiment of the present invention.

FIG. 8 is a plan view of an example of a liquid crystal display apparatus that is manufactured by a manufacturing method according to the second embodiment of the present invention. This liquid crystal display apparatus is different from that shown in FIG. 1A in that additional pillars 7 are continuously formed between the two corners (ends) of the lower side of a second glass substrate 2 in FIG. 8 and a first glass substrate 1 and on the upper surfaces of the two corners (ends) of the upper side of a projection 1a of the first glass substrate 1 in FIG. 8.

Figure 9:
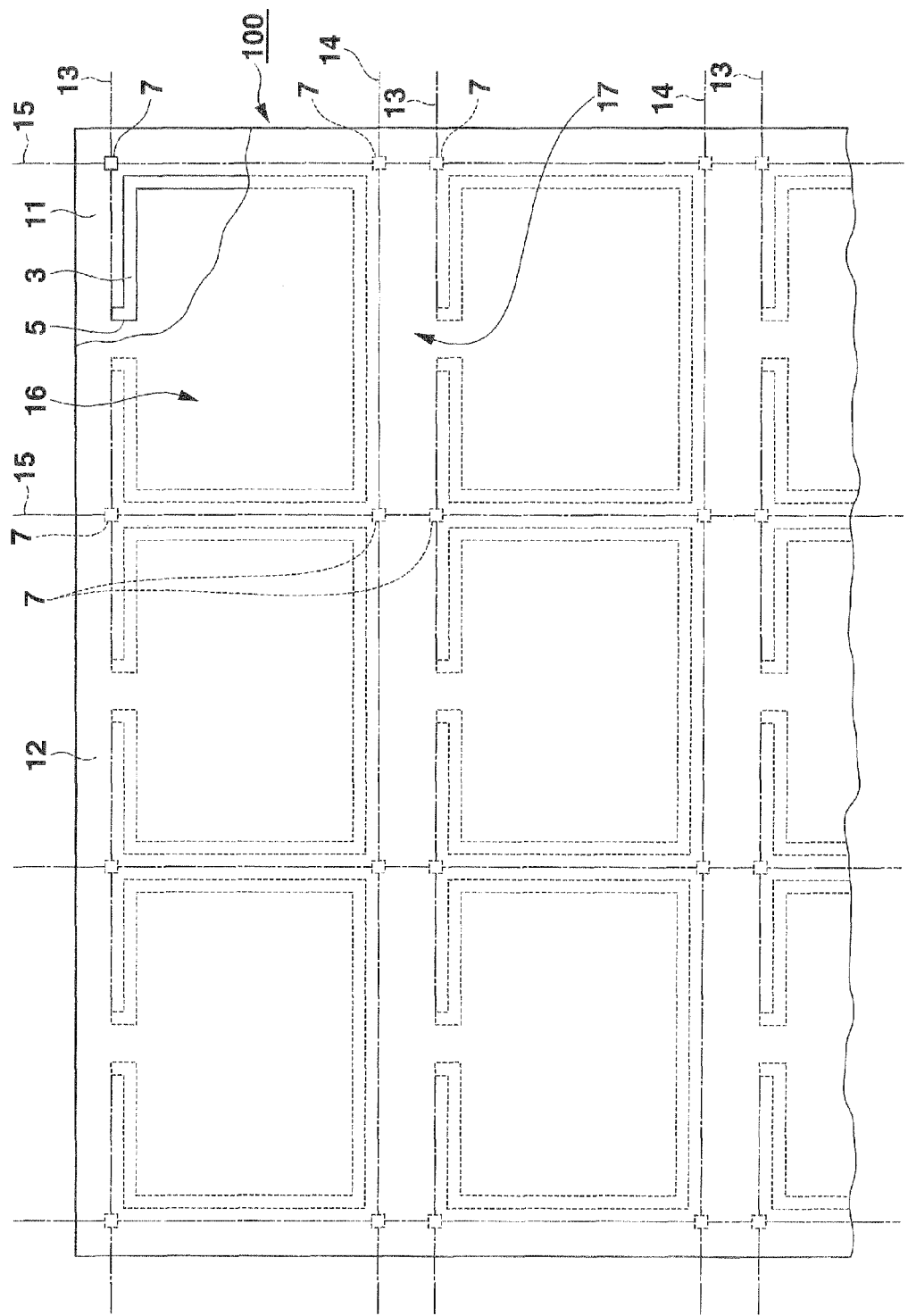
FIG. 9 is a plan view, similar to FIG. 3, to explain an example of a method of manufacturing the liquid crystal display apparatus shown in FIG. 8.

FIG. 9 is a plan view, similar to FIG. 3, to explain an example of a method of manufacturing the liquid crystal display apparatus shown in FIG. 8. FIG. 9 is different from FIG. 3 in that additional pillars 7 are interposed between two large glass substrates 11 and 12 at portions corresponding to the intersections of second scribe line virtual lines 14 and third scribe line virtual lines 15. With a manufacturing process similar to that of the first embodiment, the liquid crystal display apparatus shown in FIG. 8 can be obtained. The error in outer shape at each of the four corners (ends) of the first and second glass substrates 1 and 2 shown in FIG. 8 can be set to 0.02 mm or less. Thus, the frequency of a defective outer shape can be suppressed.

Third Embodiment

Figure 10:
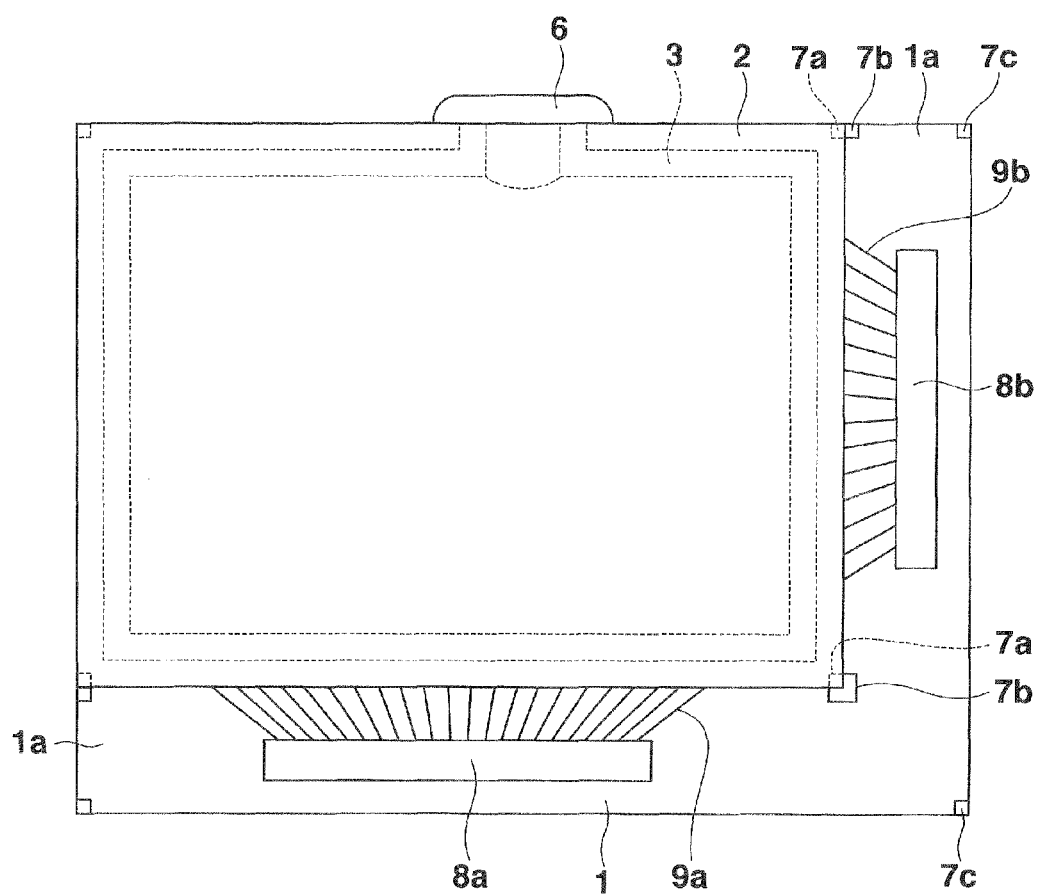
FIG. 10 is a plan view of an example of a liquid crystal display apparatus that is manufactured by a manufacturing method according to the third embodiment of the present invention.

FIG. 10 is a plan view of an example of a liquid crystal display apparatus that is manufactured by a manufacturing method according to the third embodiment of the present invention. This liquid crystal display apparatus is largely different from that shown in FIG. 1A in that the two adjacent sides (a lower side and a right side) of a first glass substrate 1 that are in contact with each other project from a second glass substrate 2. In the same manner as in the first and second embodiments described above, that portion of the first glass substrate 1 that projects from the second glass substrate 2 is called a projection 1a. A data driving circuit 8a is mounted on that portion of the projection 1a where the first glass substrate 1 projects downward from the second glass substrate 2. A gate driving circuit 8b is mounted on that portion of the projection 1a where the first glass substrate 1 projects rightward from the second glass substrate 2. Thin film transistors, pixel electrodes, and the like (not shown), and gate lines 9b and drain lines 9a to drive the film transistors, pixel electrodes, and the like are formed on the upper surface of the first glass substrate 1. The wiring lines lead to the projection 1a. One end of each gate line 9b and one end of each drain line 9a respectively form connection terminals to electrically connect to corresponding output terminals of the gate driving circuit 8b and data driving circuit 8a. The respective input terminals of the gate driving circuit 8b and data driving circuit 8a are electrically connected to the connection terminals of input wiring lines (not shown) formed on the upper surface of the first glass substrate 1.

Pillars 7a are formed between the four corners (ends) of the second glass substrate 2 and the first glass substrate 1. On the upper surface of the projection 1a of the first glass substrate 1, in regions respectively adjacent to the three corners (ends), i.e., the upper right corner (end), lower right corner (end), and lower left corner (end), of the second glass substrate 2 in FIG. 10, pillars 7b are respectively formed to be continuous to the corresponding pillars 7a formed on the three corners (ends) of the second glass substrate 2 described above. Pillars 7c are formed on the upper surfaces of the three corners (ends), i.e., the upper right corner (end), lower right corner (end), and lower left corner (end), of the first glass substrate 1 in FIG. 10.

Figure 11:
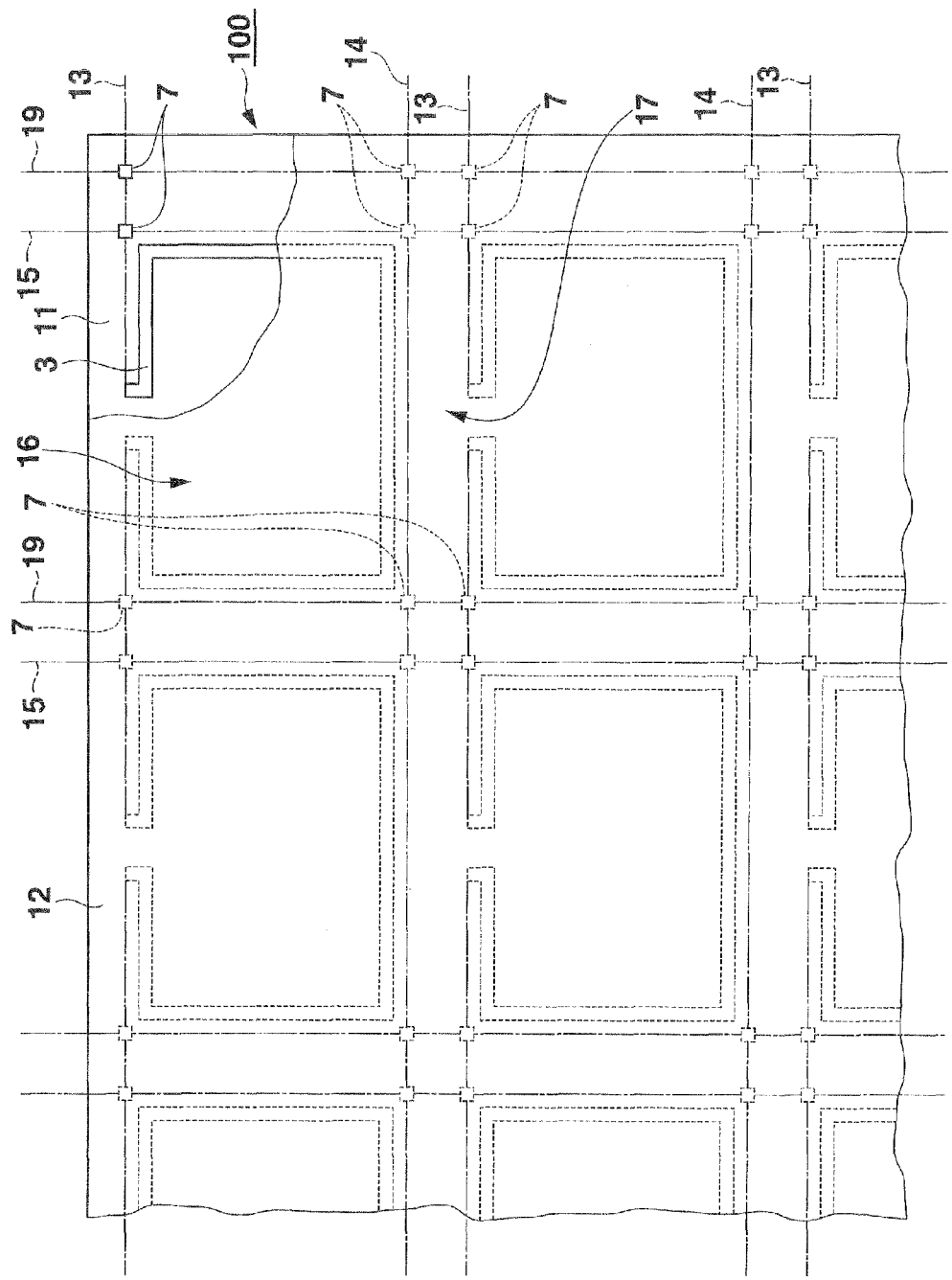
FIG. 11 is a plan view, similar to FIG. 3, to explain an example of a method of manufacturing the liquid crystal display apparatus shown in FIG. 10.

FIG. 11 is a plan view, similar to FIG. 3, to explain an example of a method of manufacturing the liquid crystal display apparatus shown in FIG. 10. FIG. 11 is largely different from FIG. 3 in that projection forming regions 17 have almost L-shaped planar surfaces, as shown in FIG. 10, to obtain a liquid crystal display apparatus in which the two adjacent sides (a lower side and a right side) of the first glass substrate 1 that are in contact with each other project from the second glass substrate 2. When the two sides of the first glass substrate 1 project in this manner, driving circuits can be mounted on the projections of the respective sides.

The regions surrounded by scribe line virtual lines 13 and 19 form liquid crystal display apparatus forming regions 16. Of each liquid crystal display apparatus forming region 16, a portion other than the region surrounded by the scribe line virtual lines 13 and 19 and scribe line virtual lines 14 and 15 forms the projection forming region 17. Pillars 7 are interposed between two large glass substrates 11 and 12 at portions corresponding to the intersections of the scribe line virtual lines 13 and 14 extending in the row directions and the scribe line virtual lines 15 and 19 extending in the column directions. With a manufacturing process almost the same as that of the first embodiment, the liquid crystal display apparatus shown in FIG. 9 can be obtained. The error in outer shape at each of the four corners (ends) of the first and second glass substrates 1 and 2 shown in FIG. 10 can be set to 0.02 mm or less. Thus, the frequency of a defective outer shape can be suppressed.

Fourth Embodiment

For example, in FIG. 3, a case has been described wherein the pillars 7 are interposed between the two large glass substrates 11 and 12 at the portions corresponding to the intersections of the first and third scribe line virtual lines 13 and 15. However, the present invention is not limited to this. For example, as in the fourth embodiment of the present invention shown in FIG. 12, pillars 7 may be formed between two large glass substrates 11 and 12, in those regions on first, second, and third scribe line virtual lines 13, 14, and 15 that do not include the intersections of the first and second scribe line virtual lines 13 and 14 and the third scribe line virtual lines 15.

Of each set of four pillars 7, the separation distance between the opposing end faces of that pair of pillars 7 that are formed on the same scribe line is set to be 1.0 mm or less. Thus, as is apparent from the experimental results described above, within 0.5 mm from the pillars 7, the error in outer shape can be set to 0.02 mm or less, so the frequency of a defective outer shape can be suppressed. More specifically, for example, the two pillars 7 that are the closest on one scribe line virtual line across the intersection of the first and third scribe line virtual lines 13 and 15 may be formed so that the separation distance between the two pillars 7 on this scribe line virtual line is 1.0 mm or less.

Fifth Embodiment

Figure 13A:
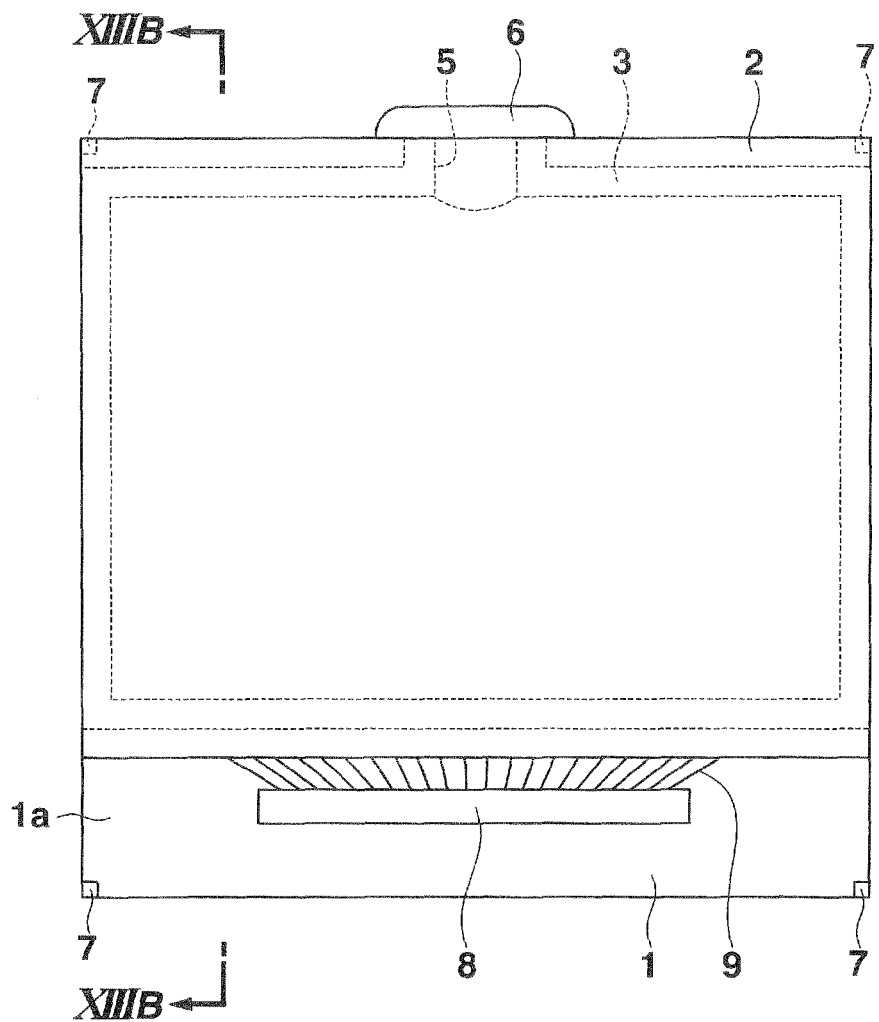
FIG. 13A is a plan view of an example of a liquid crystal display apparatus that is manufactured by a manufacturing method according to the fifth embodiment of the present invention.
Figure 13B:
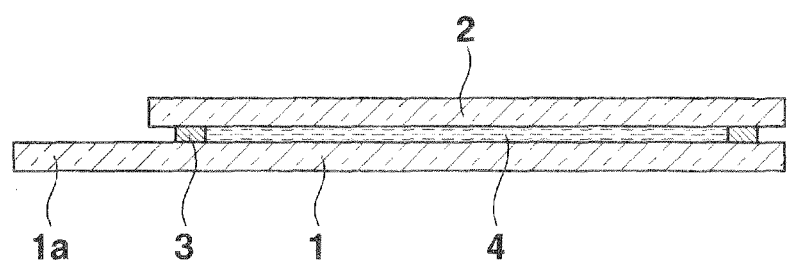
FIG. 13B is a sectional view taken along the line XIIIB-XIIIB of FIG. 13A.

FIG. 13A is a plan view of a liquid crystal display apparatus according to the fifth embodiment of the present invention, and FIG. 13B is a sectional view taken along the line XIIIB-XIIIB of FIG. 13A. This liquid crystal display apparatus is largely different from that shown in FIG. 1A in that the outer end faces of the left side and right side of a seal member 3 are located at the same positions as the end faces of the left side and right side of a second glass substrate 2.

The lower side of a first glass substrate 1 in FIG. 13A projects from the second glass substrate 2. That portion of the first glass substrate 1 which projects from the second glass substrate 2 is called a projection 1a. Connection terminals (not shown) and the like are formed on the upper surface of the projection 1a. As shown in FIG. 13A, the width of the seal member 3 is the same throughout its entire portion. The outer end faces of the upper side and lower side of the seal member 3 excluding its liquid crystal filling hole 5 are arranged on the more inner side than the end faces of the upper side and lower side of the second glass substrate 2. The outer end faces of the left side and right side (two opposing sides) of the seal member 3 are arranged at the same positions as the end faces of the left side and right side (two opposing sides) of the second glass substrate 2.

Pillars 7, each of which has an almost square shape when seen from the top and two ends abutting against the glass substrates 1 and 2, are arranged between the two corners (ends) of the upper side of the second glass substrate 2 in FIG. 13A and the first glass substrate 1. Pillars 7, each of which has an almost square shape when seen from the top, are formed on the upper surfaces of the two corners (ends) of the lower side of the projection 1a of the first glass substrate 1.

Figure 14:
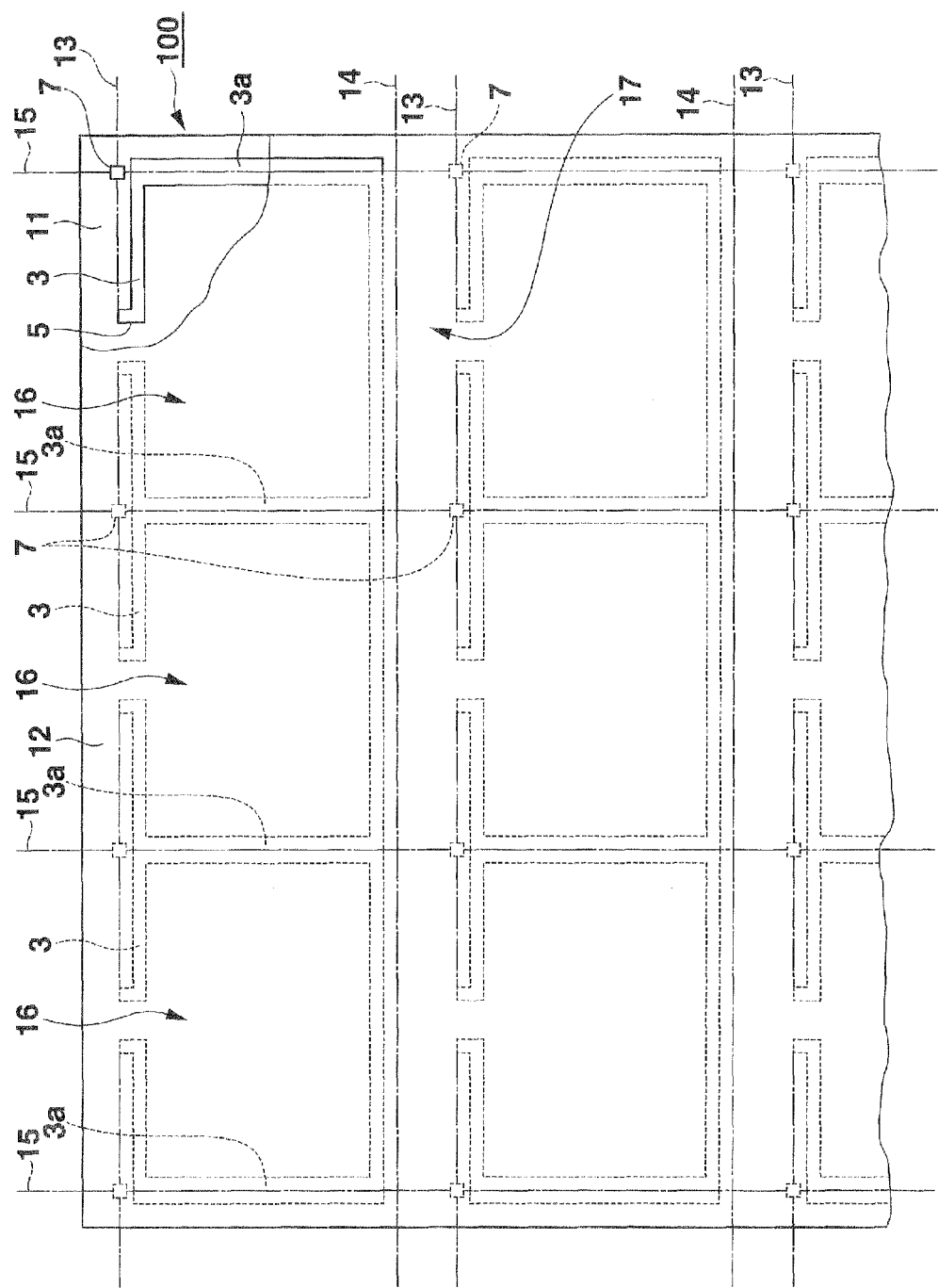
FIG. 14 is a partially cutaway plan view in which first and second large glass substrates are partially cut away to explain steps S1 to S5 in FIG. 2.

An example of a method of manufacturing this liquid crystal display apparatus will be described with reference to the manufacturing process flowchart shown in FIG. 2, as it is the same as that of the first embodiment described above. First, in step S1 (prepare two large glass substrates) of FIG. 2, two large glass substrates 11 and 12, each having such an area that (e.g., 3×3=9) finished liquid crystal display apparatuses can be formed thereon, as shown in FIG. 14, are prepared. Thin film transistors, pixel electrodes, and the like (not shown) are formed on one surface of the first large glass substrate 11, and common electrodes (not shown) and the like are formed on one surface of the second large glass substrate 12. Regions surrounded by one-dot dashed lines 13 and 15 (to be described later) are liquid crystal display apparatus forming regions 16. Of regions surrounded by the one-dot dashed lines 13 and 15 and one-dot dashed lines 14, those where no seal members 3 are provided are projection (1a) forming regions 17. No extra regions are formed between the liquid crystal display apparatus forming regions 16 that are adjacent to each other in the row direction and column direction. Thus, one side (e.g., the right side) of the sides of one liquid crystal display apparatus among the liquid crystal display apparatuses manufactured from the large glass substrates 11 and 12 is shared by one side (e.g., the left side) of the other sides of another liquid crystal display apparatus that is adjacent to the one liquid crystal display apparatus.

In step S2 (form seal member) of FIG. 2, the almost square frame-like seal member 3 made of a thermosetting epoxy-based resin or the like is formed within each liquid crystal display apparatus forming region 16 on one surface of the first large glass substrate 11 by screen printing, a dispenser method, or the like to surround a region excluding the corresponding projection forming region 17. Simultaneously, the pillars 7, each of which has an almost square shape when seen from the top and is made of a thermosetting epoxy-based resin or the like, are provided at the four corners (ends) of each liquid crystal display apparatus forming region 16 on one surface of the first large glass substrate 11.

Referring to FIG. 14, the liquid crystal filling hole 5 is formed at one portion of the upper side of each seal member 3. Also, the outer end faces of the upper side and lower side of the seal member 3 excluding its liquid crystal filling hole 5 are arranged on the more inner side than the upper side and lower side of that region of the liquid crystal display apparatus forming region 16 that excludes the projection forming region 17. A left side (common side) 3a of a seal member 3 arranged at the central portion in the row direction is shared by a right side (common side) 3a of a left adjacent seal member 3. A right side (common side) 3a of the seal member 3 arranged at the central portion in the row direction is shared by a left side (common side) 3a of a right adjacent seal member 3.

The left side of the seal member 3 arranged on the left side in the row direction forms a kind of common side 3a that is continuously connected to a seal member arranged on the left side of the liquid crystal display apparatus forming region 16, including this seal member 3, to be axi-symmetric about the one-dot dashed line 15 as the center. The right side of the seal member 3 arranged, on the right side in the row direction forms a kind of common side 3a that is continuously connected to a seal member arranged on the right side of the liquid crystal display apparatus forming region 16, including this seal member 3, to be axi-symmetric about the one-dot dashed line 15 as the center. Regarding the width of the common side 3a of the seal member 3, if the width of the other portion is 0.6 mm to 0.8 mm, the former is twice that of the latter, i.e., 1.2 mm to 1.6 mm.

Subsequently, in step S3 (adhere substrates) of FIG. 2, the first and second large glass substrates 11 and 12 prepared in step S1 are arranged through the seal members 3 and pillars 7 such that one surface of the first large glass substrate 11 opposes one surface of the second large glass substrate 12. The seal members 3 and pillars 7 are heated and set so that the two large glass substrates 11 and 12 adhere to each other through them. In the following description, the assembly including the two large glass substrates 11 and 12 that are adhered in this manner will be referred to as a liquid crystal display apparatus forming assembly 100.

In FIG. 14, the one-dot dashed lines extending in the row directions along the respective distal ends of the liquid crystal filling holes 5 of the seal members 3 are first scribe line virtual lines 13. The one-dot dashed lines extending in the row directions along the outer sides of the respective lower sides of the seal members 3 are second scribe line virtual lines 14. The one-dot dashed lines extending in the column directions along the centers in the widthwise directions of the common sides 3a of the seal members 3 are third scribe line virtual lines 15. As will be described later, scribe lines are formed, on that other surface of the first large glass substrate 11 and that other surface of the second large glass substrate 12, constituting the outer surfaces of the liquid crystal display apparatus forming assembly 100, which are opposite to the surfaces that oppose each other, each along any one of the scribe line virtual lines 13, 14, and 15.

The pillars 7 are interposed between the two large glass substrates 11 and 12 at portions corresponding to the intersections of the first scribe line virtual lines 13 extending in the row directions and the third scribe line virtual lines 15 extending in the column directions. The two ends of each pillar 7 abut against the first and second large glass substrates 11 and 12, respectively. In this case, the planar size of the pillar 7 is lager than the planar size of the region where the scribe line formed along the first scribe line virtual line 13 extending in the row direction and the scribe line formed along the third scribe line virtual line 15 extending in the column direction intersect. For example, the planar size of the pillar 7 is 0.3 mm×0.3 mm. As will be described later, each scribe line formed along the first or third scribe line virtual line 13 or 15 has a width of approximately 20 μm. The first and third scribe line virtual lines 13 and 15 extend through the center point of the corresponding pillar 7.

In step S4 (first cutting) of FIG. 2, while the liquid crystal display apparatus forming assembly 100 shown in FIG. 14 is turned over, using a scriber, the first and third scribe lines are formed on the outer surface of the first large glass substrate 11, which is located on the upper side, along the first and third scribe line virtual lines 13 and 15. Then, the liquid crystal display apparatus forming assembly 100 is turned over. An external force is applied to the first and third scribe line portions of the first large glass substrate 11 through the seal members 3 and the like by, e.g., pressurizing the upper surface of the second large glass substrate 12 that is located on the upper side, or applying an impact to this upper surface, to cut the first large glass substrate 11, which is located on the lower side, along the first and third scribe lines.

In step S5 (second cutting) of FIG. 2, using the scriber, the first, second, and third scribe lines are formed on the outer surface of the second large glass substrate 12, which is located on the upper side, along the first, second, and third scribe line virtual lines 13, 14, and 15. Then, the liquid crystal display apparatus forming assembly 100 is turned over. An external force is applied to the first, second, and third scribe line portions of the second large glass substrate 12 through the seal members 3 and the like by, e.g., pressurizing the upper surface of the first large glass substrate 11 that is located on the upper side, or applying an impact to this upper surface, to cut the second large glass substrate 12, which is located on the lower side, along the first, second, and third scribe lines.

Figure 15:
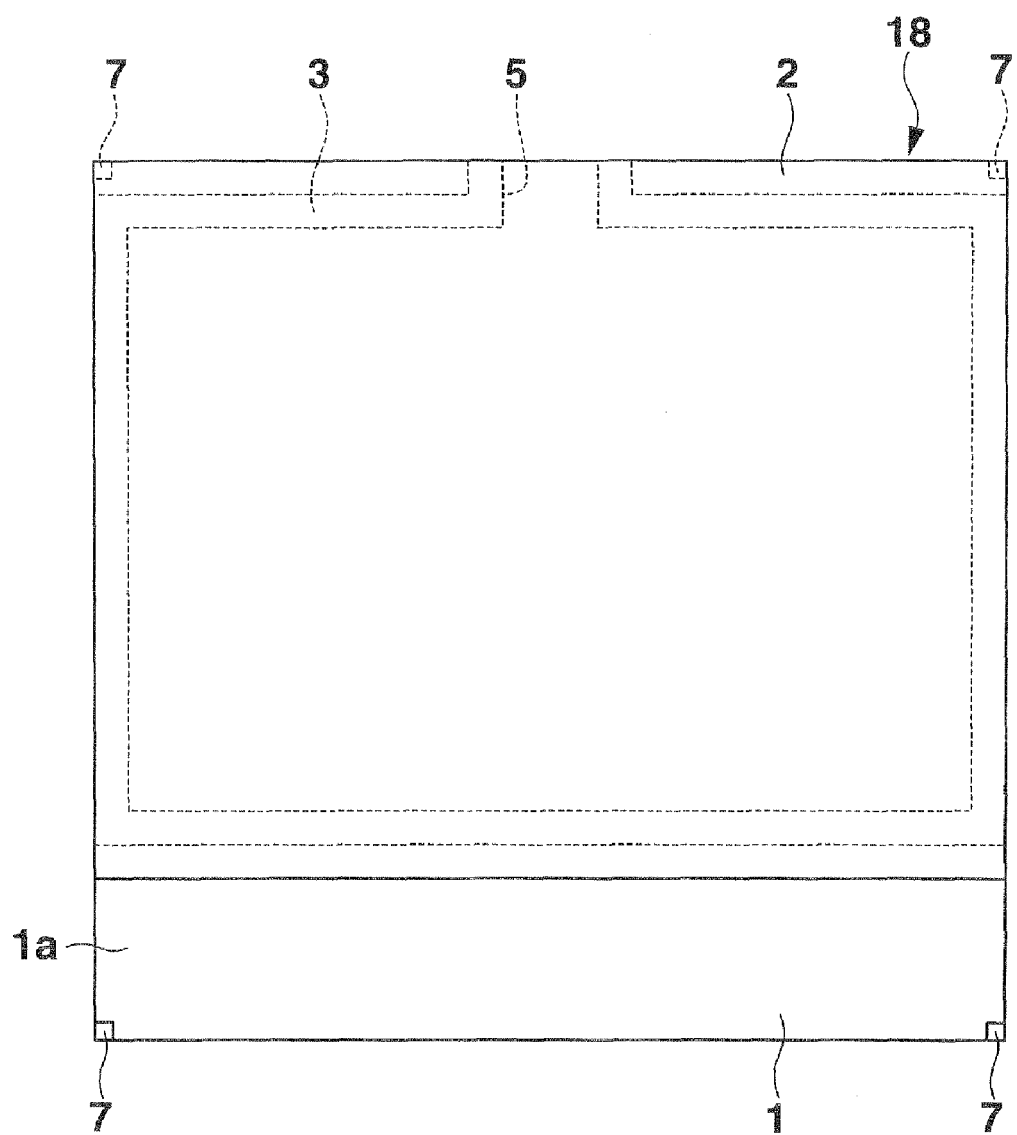
FIG. 15 is a plan view of a liquid crystal cell that is obtained by step S5 (second cutting) in FIG. 2.

Hence, nine liquid crystal cells 18 each shown in FIG. 15 are obtained. In this state, of each second large glass substrate 12, the portion corresponding to the projection forming region 17 (of the region between the first and second scribe line virtual lines 13 and 14 shown in FIG. 14, that region where the seal member 3 is not formed) is removed to expose the projection 1a of the first glass substrate 1. In FIG. 14, the common sides 3a of the seal members 3 are cut, together with the two large glass substrates 11 and 12, at their centers in the widthwise direction, i.e., along the third scribe line virtual lines 15. Hence, in FIG. 15, the outer end faces of the left side and right side of the seal member 3 are located at the same positions as the end faces of the left side and right side of the second glass substrate 2. The width of the seal member 3 is the same throughout its entire portion.

Furthermore, in FIG. 14, the pillars 7 are cut together with the two large glass substrates 11 and 12 to each form a cross when seen from the top. Thus, in the state shown in FIG. 15, the pillars 7, each having an almost square shape when seen from the top, remain between the two corners (ends) of the upper side of the second glass substrate 2 and the first glass substrate 1. The pillars 7, each having an almost square shape when seen from the top, remain on the upper surfaces of the two corners (ends) of the lower side of the projection 1a of the first glass substrate 1. The function of the pillars 7 is as described above.

In step S6 (fill liquid crystal) of FIG. 2, a liquid crystal (not shown) is filled between the two glass substrates 1 and 2 inside the seal member 3 of the liquid crystal cell 18 through the liquid crystal filling hole 5 of the seal member 3. Subsequently, in step S7 (seal liquid crystal filling hole) of FIG. 2, a photo-setting sealant 6 (see FIG. 1A) is provided at the liquid crystal filling hole 5 of the seal member 3 of the liquid crystal cell 18, and is set by light such as ultraviolet rays to seal the liquid crystal filling hole 5. In step S8 (mount driving circuit) of FIG. 2, a polarizing plate is adhered to the liquid crystal cell, and a driving circuit is mounted on the liquid crystal cell. Thus, the liquid crystal display apparatus shown in FIGS. 13A and 13B can be obtained.

Based on the above experimental results, in the liquid crystal display apparatus forming assembly 100 shown in FIG. 14, assume that the pillars 7 were provided at portions corresponding to the intersections of the first and third scribe line virtual lines 13 and 15, where the frequency of the defective outer shape was conventionally high, as in the liquid crystal display apparatus according to the first embodiment described above. Then, at the four corners (ends) of the first glass substrate 1 shown in FIG. 15 that was obtained by cutting the liquid crystal display apparatus forming assembly 100, the frequency of the defective outer shape could be suppressed. Similarly, at the two corners (ends) of the upper side of the second glass substrate 2 shown in FIG. 15, the same effect as that obtained at the four corners (ends) of the first glass substrate 1 described above could be obtained.

In the liquid crystal display apparatus forming assembly 100 shown in FIG. 14, the common sides 3a of the seal members 3 are cut, together with the two large glass substrates 11 and 12, at their centers in the widthwise direction. Thus, the cutting surface of the first glass substrate 1 at the portion corresponding to the common side 3a can be regarded to be identical to the cutting surface at the central point 21a of the pillar 7 in FIG. 6. The same effect was obtained in actual cutting as well.

In the liquid crystal display apparatus shown in FIG. 13, the outer end faces of the left side and right side of the seal member 3 are located at the same positions as the end faces of the left side and right side of the second glass substrate 2. When compared to a case shown in FIG. 5 in which the outer end faces of the left side and right side of the seal member 3 are arranged on the more inner side than the end faces of the left side and right side of the second glass substrate 2, the area of the frame can be decreased.

Sixth Embodiment

Figure 16:
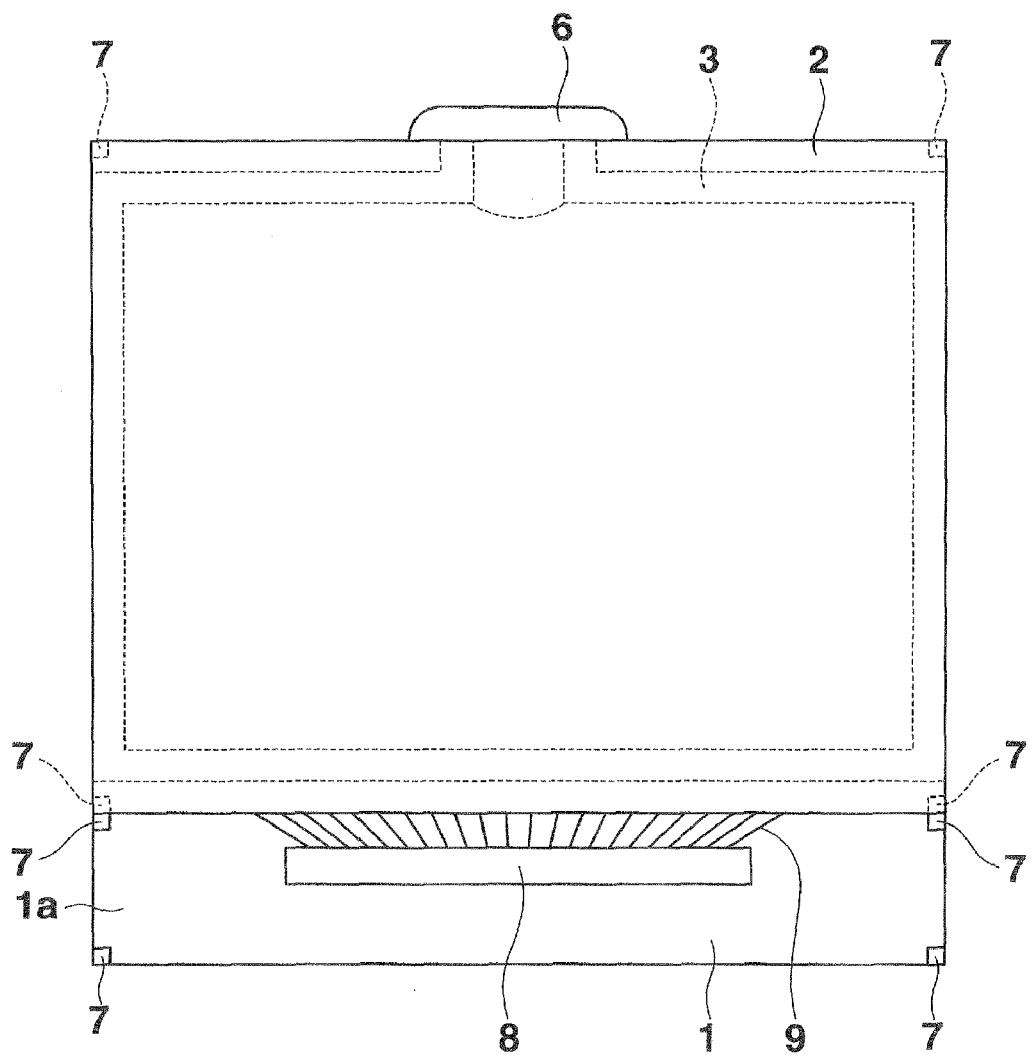
FIG. 16 is a plan view of a liquid crystal cell according to the sixth embodiment of the present invention.

FIG. 16 is a plan view of a liquid crystal display apparatus according to the sixth embodiment of the present invention. This liquid crystal display apparatus is different from that shown in FIG. 13A in that additional pillars 7 are continuously formed between the two corners (ends) of the lower side of a second glass substrate 2 in FIG. 16 and a first glass substrate 1 and on the upper surfaces of the two corners (ends) of the upper side of a projection 1a of the first glass substrate 1 in FIG. 16.

Figure 17:
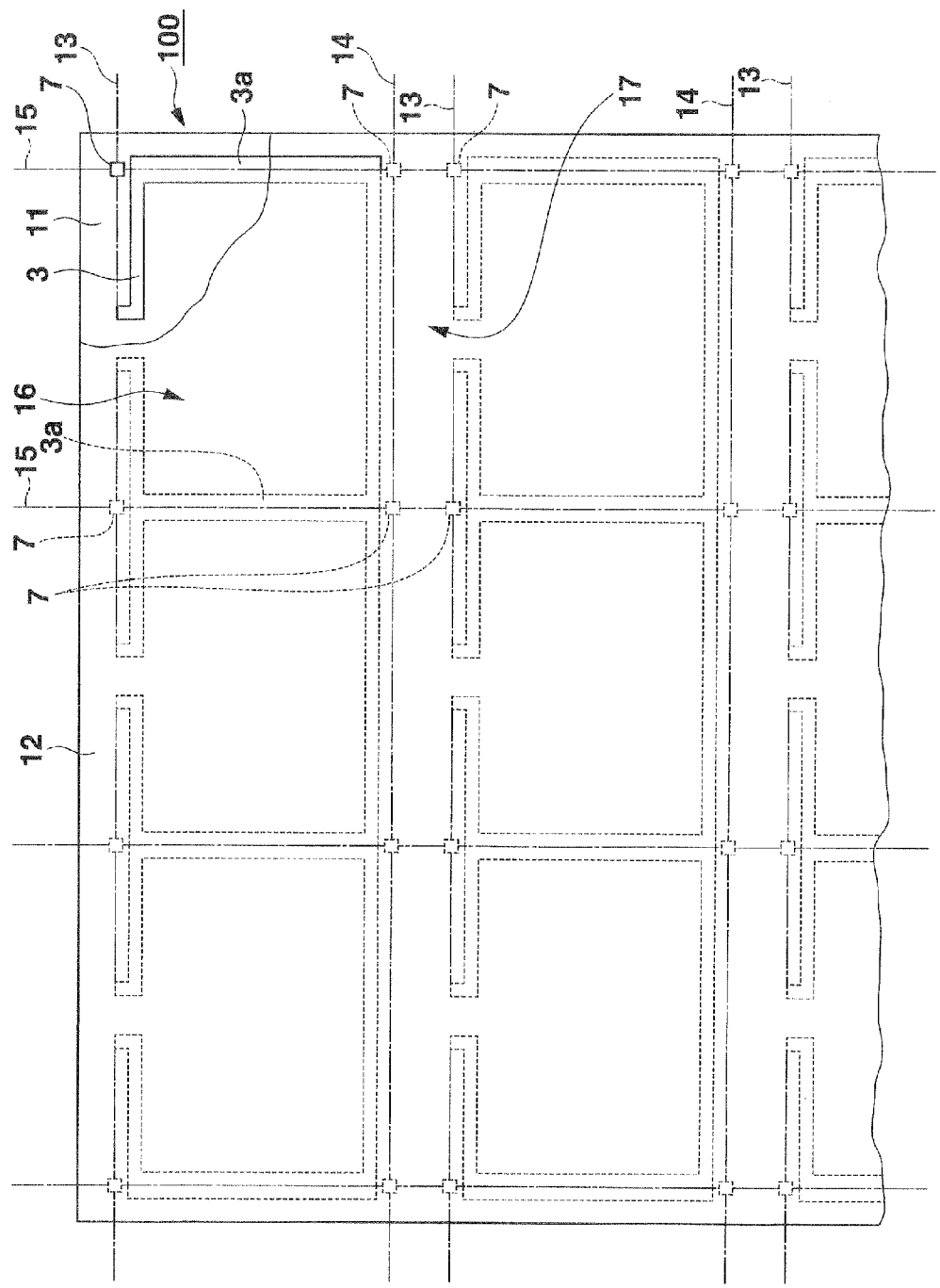
FIG. 17 is a plan view, similar to FIG. 14, to explain an example of a method of manufacturing the liquid crystal cell shown in FIG. 16.

FIG. 17 is a plan view, similar to FIG. 14, to explain an example of a method of manufacturing the liquid crystal display apparatus shown in FIG. 16. FIG. 17 is different from FIG. 14 in that additional pillars 7 are interposed between two large glass substrates 11 and 12 at portions corresponding to the intersections of second scribe line virtual lines 14 and third scribe line virtual lines 15. With a manufacturing process similar to that of the fifth embodiment, the liquid crystal display apparatus shown in FIG. 16 can be obtained. The error in outer shape at the four corners (ends) of the first and second glass substrates 1 and 2 shown in FIG. 16 can be set to 0.02 mm or less. Thus, the frequency of a defective outer shape can be suppressed.

Seventh Embodiment

Figure 18:
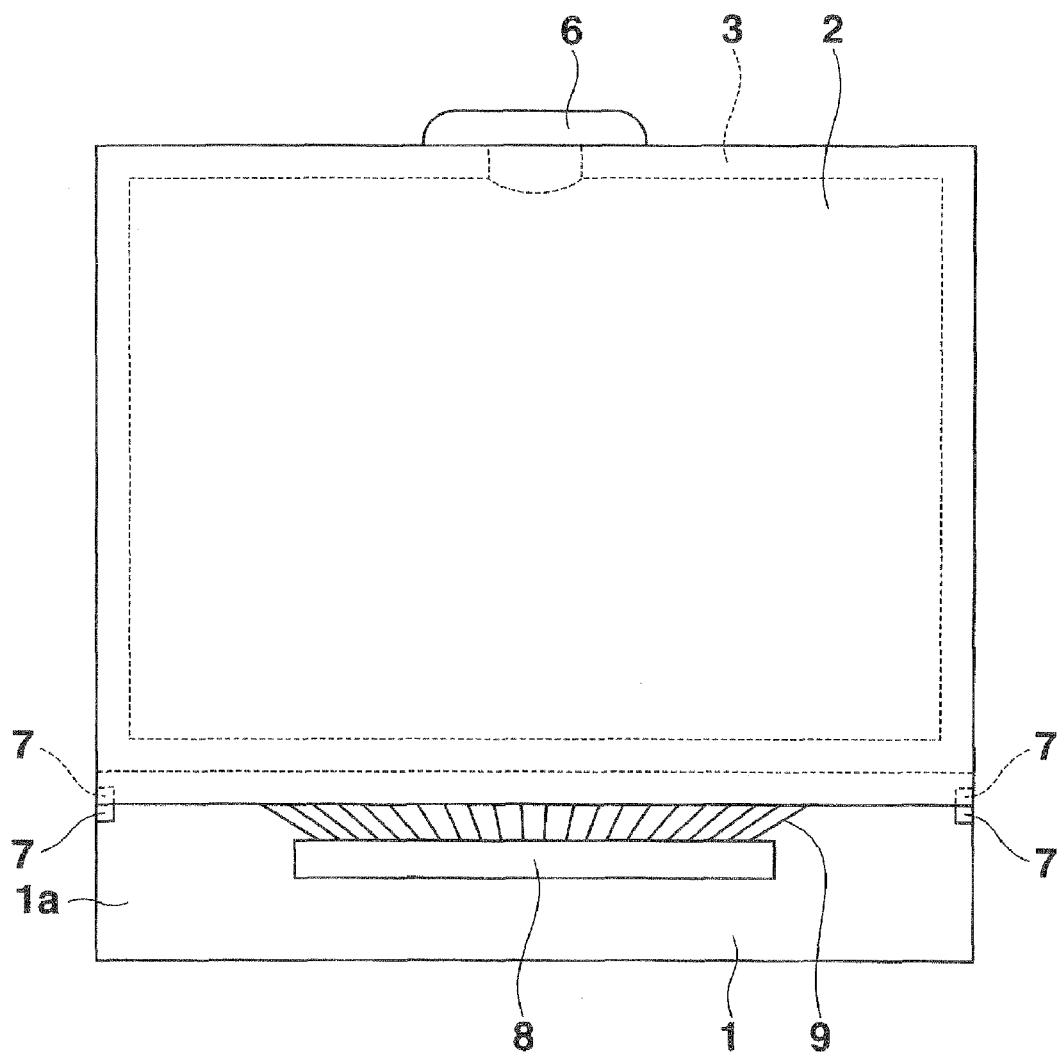
FIG. 18 is a plan view of a liquid crystal cell according to the seventh embodiment of the present invention.

FIG. 18 is a plan view of a liquid crystal display apparatus according to the seventh embodiment of the present invention. This liquid crystal display apparatus is different from that shown in FIG. 16 in that the outer end face of the upper side of a seal member 3 is arranged at the same position as the end face of the upper side of a second glass substrate 2, and that no pillars 7 are formed on the upper surfaces of the two corners (ends) of the lower side of a projection 1*a* of a first glass substrate 1.

Figure 19:
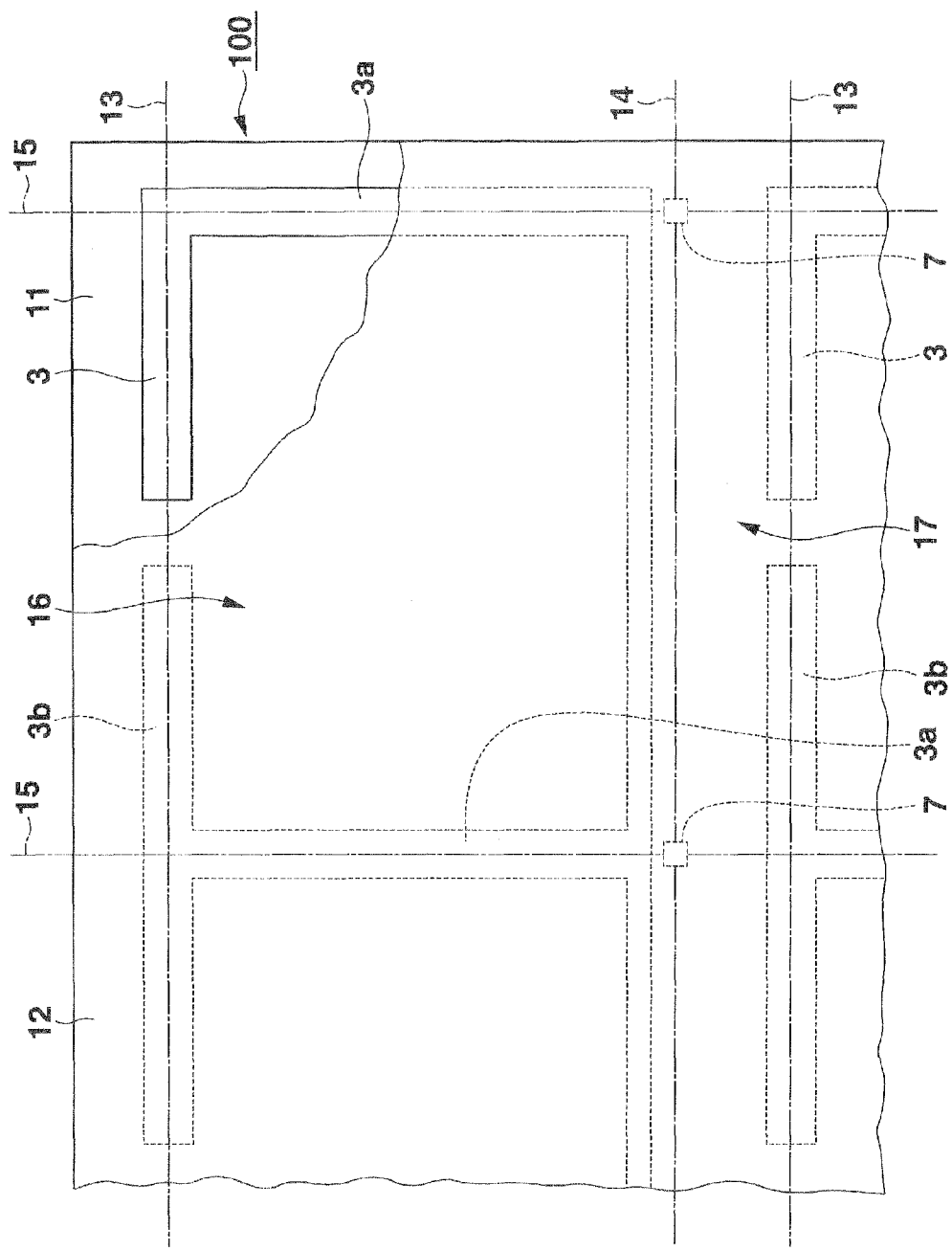
FIG. 19 is a plan view, similar to FIG. 12, to explain an example of a method of manufacturing the liquid crystal cell shown in FIG. 18.

FIG. 19 is a plan view, similar to FIG. 12, to explain an example of a method of manufacturing the liquid crystal display apparatus shown in FIG. 18. FIG. 19 is different from FIG. 12 in that the upper side of each seal member 3 forms a kind of common side 3*b* that is continuously connected to a seal member arranged on the upper side of a liquid crystal display apparatus forming region 16, including this seal member 3, to be vertically symmetric about a first scribe line virtual line 13 as the center, and that no pillars 7 are provided at portions corresponding to the intersections of the first scribe line virtual lines 13 and third scribe line virtual lines 15.

Figure 20:
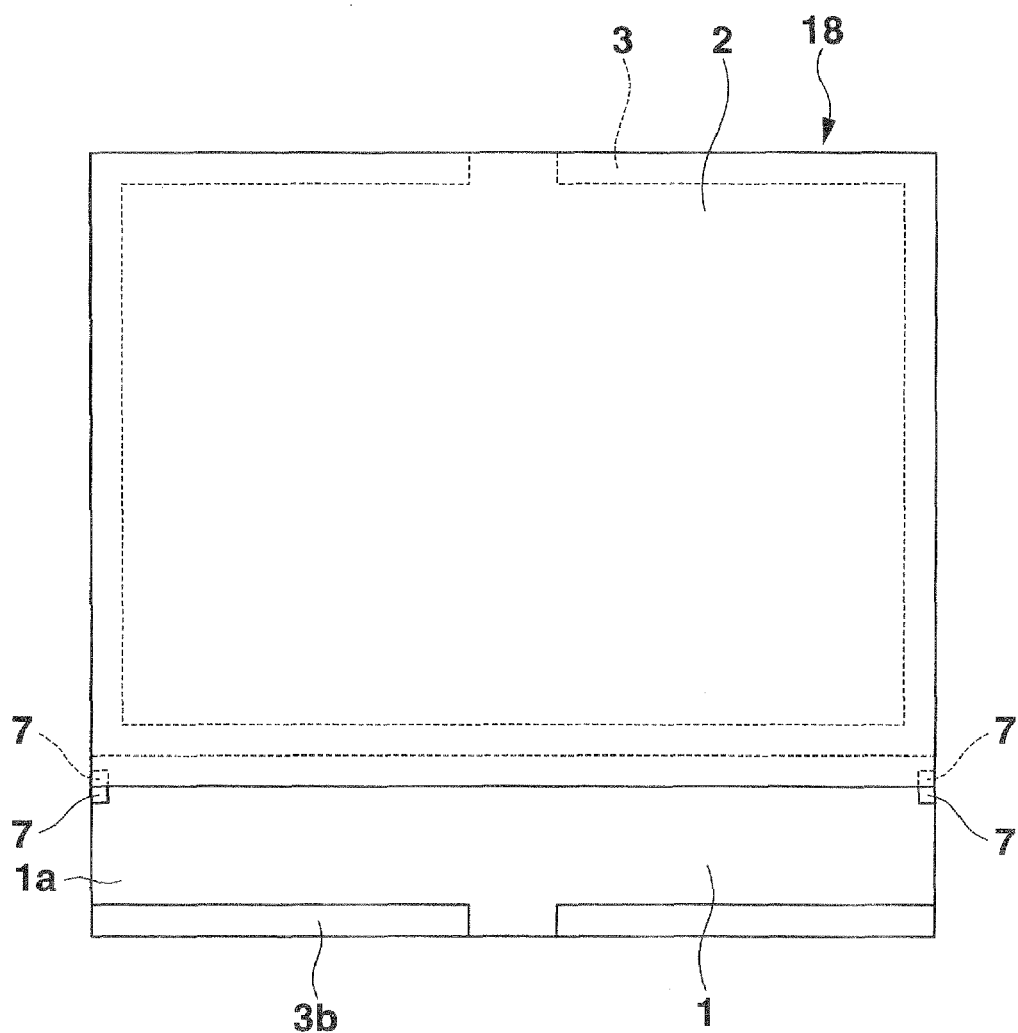
FIG. 20 is a plan view of a liquid crystal cell that is obtained by cutting the liquid crystal display apparatus forming assembly shown in FIG. 19.

With the first and second cutting steps of steps S4 and S5 shown in FIG. 2, a liquid crystal cell 18 shown in FIG. 20 can be obtained, in the same manner as in the fifth embodiment described above. In the liquid crystal cell 18, seal members 3*b* remain on the upper surface of the lower side of the projection 1*a* of the first glass substrate 1 in FIG. 20. The remaining seal members 3*b* cause obstacles when bonding a flexible circuit board (not shown) to connection terminals (not shown) formed on the upper surface of the projection of the first glass substrate 1. Thus, the remaining seal members 3*b* are removed by using a solvent or by mechanical grinding.

In step S6 (fill liquid crystal) of FIG. 2, a liquid crystal (not shown) is filled between the two glass substrates 1 and 2 inside the seal member 3 of the liquid crystal cell 18 through a liquid crystal filling hole 5 of the seal member 3. Subsequently, in step S7 (seal liquid crystal filling hole) of FIG. 2, a photo-setting sealant 6 (see FIG. 1A) is provided at the liquid crystal filling hole 5 of the seal member 3 of the liquid crystal cell 18, and is set by light such as ultraviolet rays to seal the liquid crystal filling hole 5. In step S8 (mount driving circuit) of FIG. 2, a polarizing plate is adhered to the liquid crystal cell, and a driving circuit is mounted on the liquid crystal cell. Thus, the liquid crystal display apparatus shown in FIG. 18 can be obtained.

The error in outer shape at each of the four corners (ends) of the first and second glass substrates 1 and 2 shown in FIG. 18 can be set to 0.02 mm or less. Thus, the frequency of a defective outer shape can be suppressed. In the liquid crystal cell shown in FIG. 18, the outer end face of the upper side of the seal member 3 is arranged at the same position as the end face of the upper side of the second glass substrate 2. When compared to the liquid crystal cell shown in FIG. 16, the length in the vertical direction decreases, thus downsizing the liquid crystal cell.

Eighth Embodiment

Figure 21:
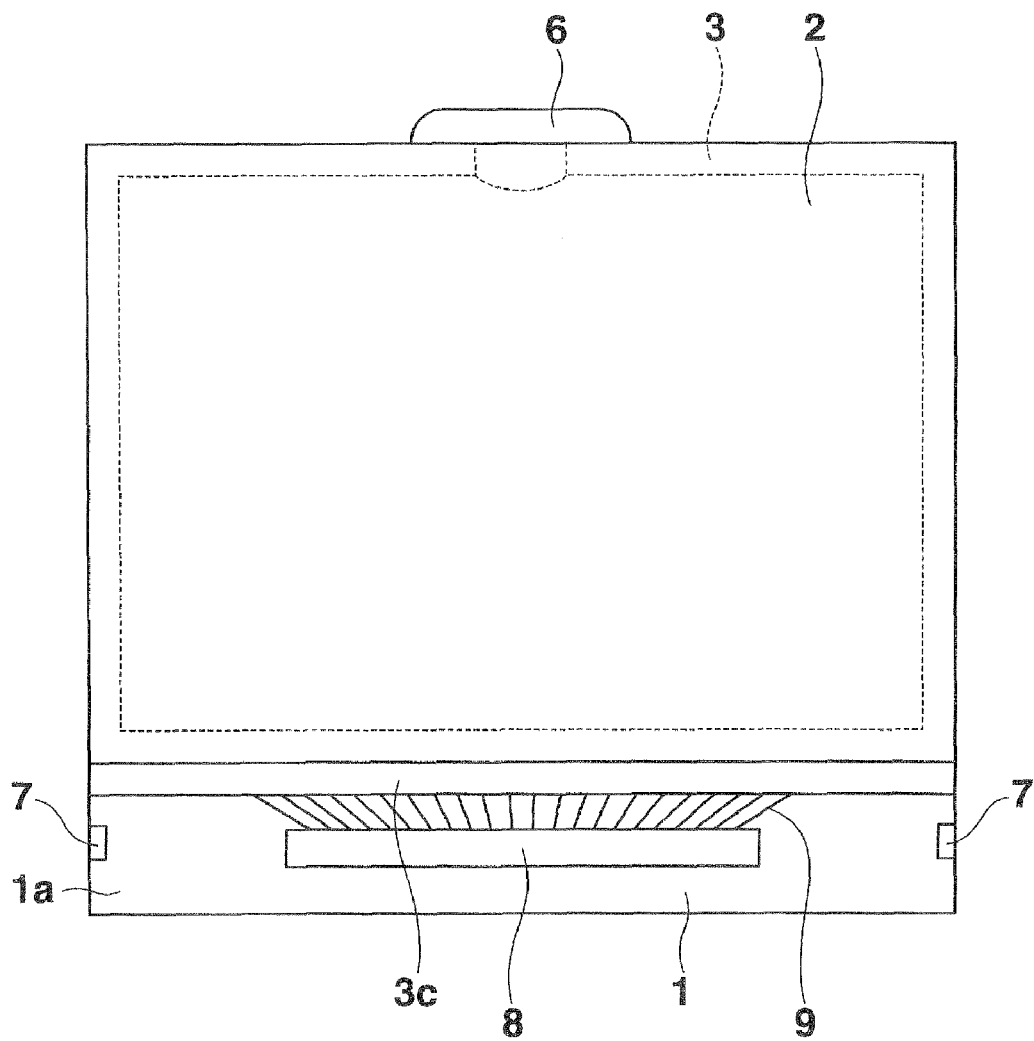
FIG. 21 is a plan view of a liquid crystal cell according to the eighth embodiment of the present invention.

FIG. 21 is a plan view of a liquid crystal display apparatus according to the eighth embodiment of the present invention. This liquid crystal display apparatus is different from that shown in FIG. 18 in that the outer end face of the lower side of a seal member 3 is arranged at the same position as the end face of the lower side of a second glass substrate 2, that a seal member 3*c* is formed on the upper surface of the upper side of a projection 1*a* of a first glass substrate 1 in FIG. 21 to be continuous with the seal member 3 interposed between the lower sides of the two glass substrates 1 and 2 in FIG. 21, and that pillars 7 are formed on the upper surfaces of the central portions of the two ends of the projection 1*a* of the first glass substrate 1.

Figure 22:
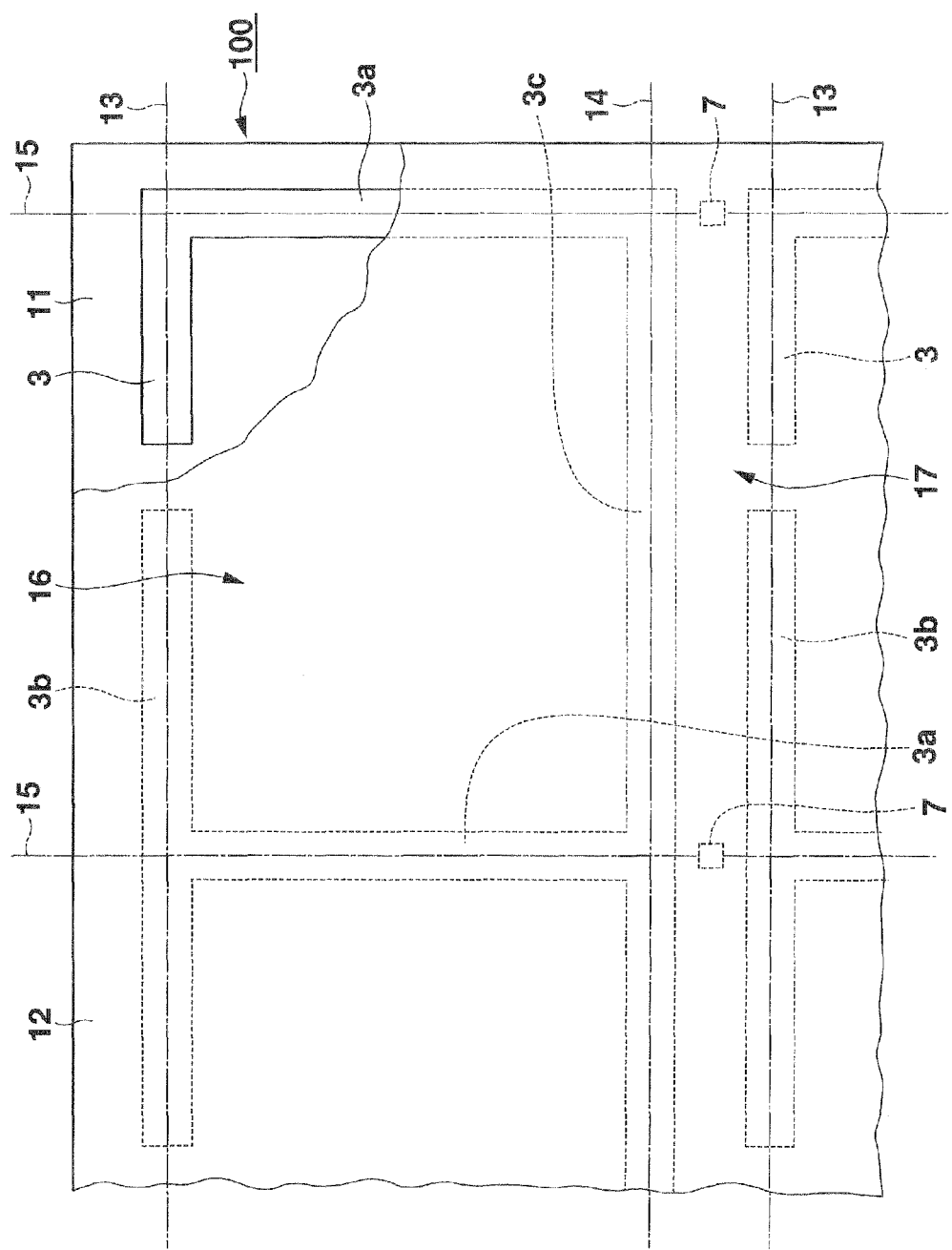
FIG. 22 is a plan view, similar to FIG. 12, to explain an example of a method of manufacturing the liquid crystal cell shown in FIG. 21.

FIG. 22 is a plan view, similar to FIG. 12, to explain an example of a method of manufacturing the liquid crystal display apparatus shown in FIG. 21. FIG. 22 is different from FIG. 12 in that the lower side of each seal member 3 forms a kind of common side 3*c* that is continuously connected to a seal member arranged on the lower side of a liquid crystal display apparatus forming region 16, including this seal member 3, to be vertically symmetric about a second scribe line virtual line 14 as the center, and that the pillars 7 are formed not at portions corresponding to the intersections of the second scribe line virtual lines 14 and third scribe line virtual lines 15, but at portions on those central portions in the widthwise directions of projection forming regions 17 that correspond to the third scribe line virtual lines 15.

Figure 23:
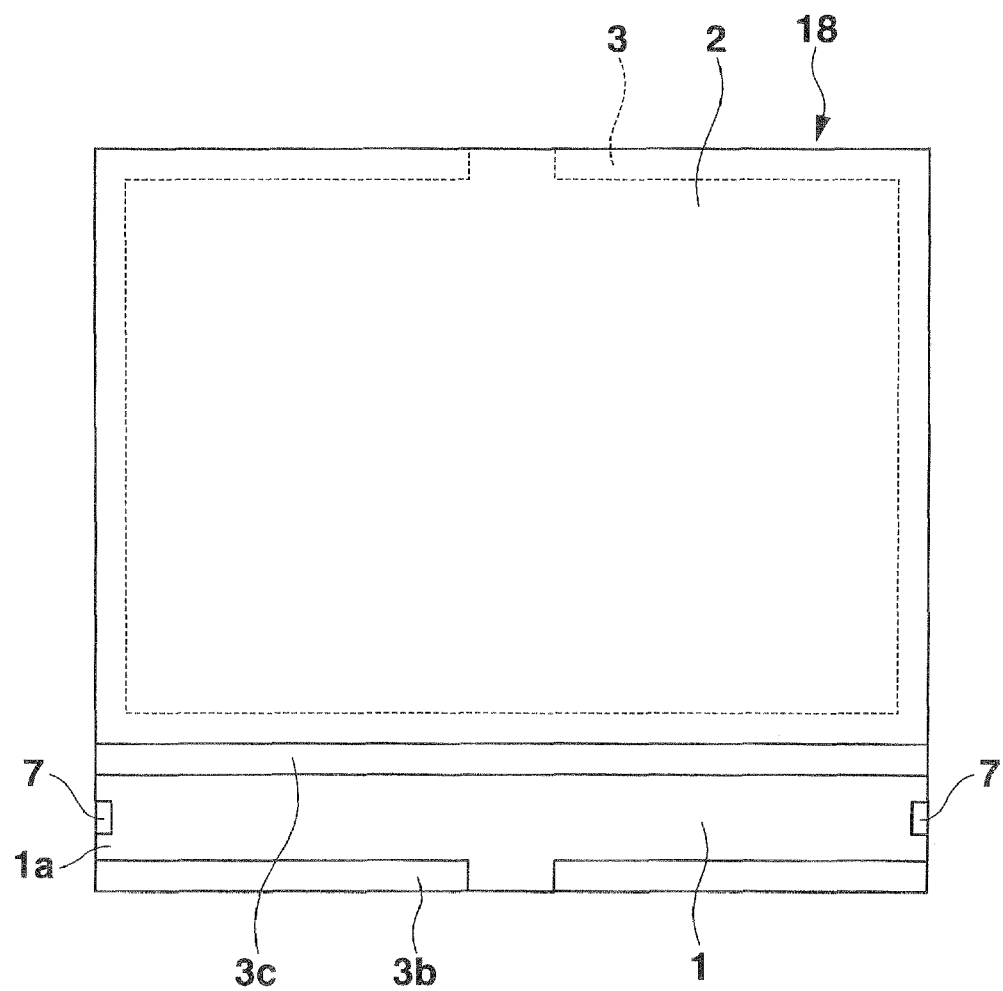
FIG. 23 is a plan view of a liquid crystal cell that is obtained by cutting the liquid crystal display apparatus forming assembly shown in FIG. 22.

With the first and second cutting steps of steps S4 and S5 shown in FIG. 2, a liquid crystal cell 18 shown in FIG. 23 can be obtained, in the same manner as in the fifth embodiment described above. In the liquid crystal cell 18, seal members 3*b* and the seal member 3*c* remain on the upper surfaces of the lower side and upper side of the projection 1*a* of the first glass substrate 1 in FIG. 23. Of the remaining seal members 3*b* and 3*c*, the seal member 3*c* does not cause an obstacle when bonding a flexible circuit board (not shown) to connection terminals (not shown) formed on the upper surface of the projection 1*a* of the first glass substrate 1. Thus, of the remaining seal members 3*b* and 3*c*, only the seal members 3*b* that cause obstacles are removed by using a solvent or by mechanical grinding.

In step S6 (fill liquid crystal) of FIG. 2, a liquid crystal (not shown) is filled between the two glass substrates 1 and 2 inside the seal member 3 of the liquid crystal cell 18 through a liquid crystal filling hole 5 of the seal member 3. Subsequently, in step S7 (seal liquid crystal filling hole) of FIG. 2, a photo-setting sealant 6 (see FIG. 1A) is provided at the liquid crystal filling hole 5 of the seal member 3 of the liquid crystal cell 18, and is set by light such as ultraviolet rays to seal the liquid crystal filling hole 5. In step S8 (mount driving circuit) of FIG. 2, a polarizing plate is adhered to the liquid crystal cell, and a driving circuit is mounted on the liquid crystal cell. Thus, the liquid crystal display apparatus shown in FIG. 21 can be obtained.

The error in outer shape at each of the four corners ends) of the first and second glass substrates 1 and 2 shown in FIG. 21 can be set to 0.02 mm or less. Thus, the frequency of a defective outer shape can be suppressed. In the liquid crystal display apparatus shown in FIG. 21, the outer end face of the lower side of the seal member 3 is arranged at the same position as the end face of the lower side of the second glass substrate 2. When compared to the liquid crystal display apparatus shown in FIG. 18, the length in the vertical direction decreases, thus downsizing the liquid crystal display apparatus.

Ninth Embodiment

Figure 24:
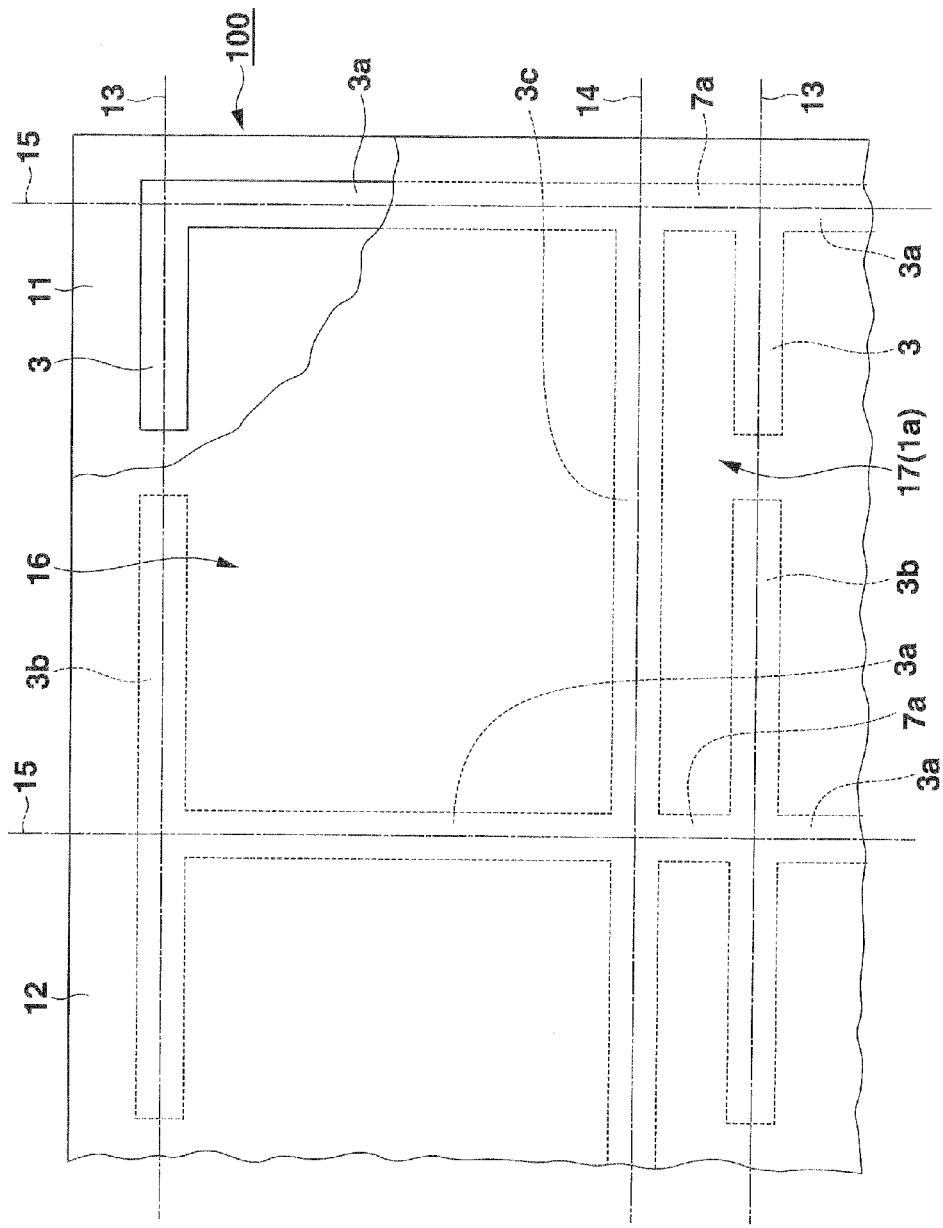
FIG. 24 is a plan view, similar to FIG. 12, to explain an example of a manufacturing method according to the ninth embodiment of the present invention.

For example, in FIG. 22, a case has been described wherein the pillars 7 are provided at those central portions in the widthwise directions of the projection forming regions 17 that correspond to the third scribe line virtual lines 15. However, the present invention is not limited to this. For example, as in the ninth embodiment of the present invention shown in FIG. 24, pillars 7*a* may be formed between two large glass substrates 11 and 12 in projection (1*a*) forming regions 17 so as to connect common sides 3*a* extending in the column directions of seal members 3 adjacent in the column direction.

When cutting the first and second large glass substrates 11 and 12 along first to third scribe line virtual lines 13 to 15, seal members 3b and 3c and the pillars 7a remain on the peripheral portion of the upper surface of the projection 1a. Of the seal members 3b and 3c and the pillars 7a, at least the seal members 3b may be removed by using a solvent or by mechanical grinding.

10th Embodiment

Figure 25:
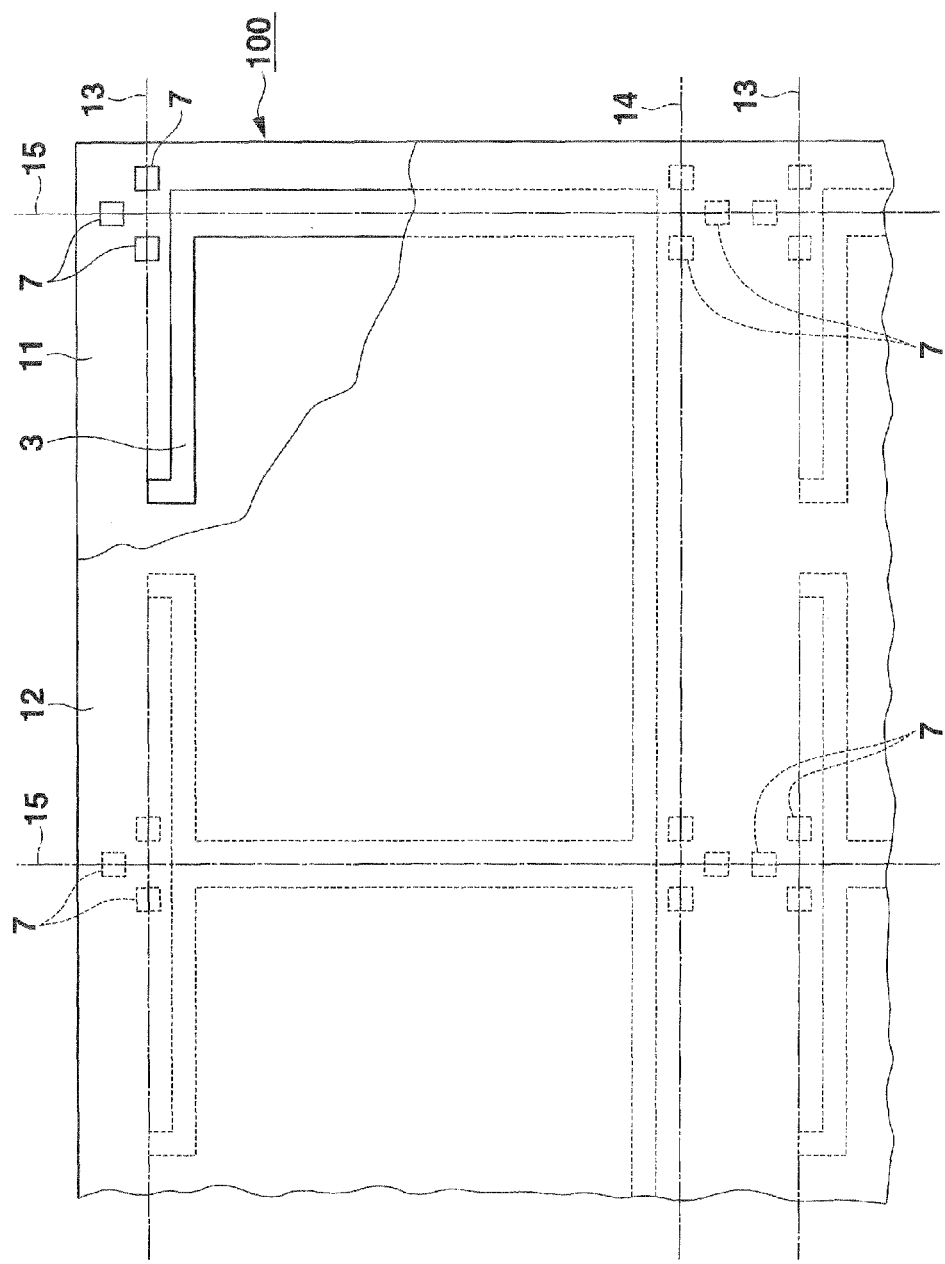
FIG. 25 is a plan view, similar to FIG. 12, to explain an example of a manufacturing method according to the 10th embodiment of the present invention.

For example, in FIG. 14, a case has been described wherein the pillars 7 are interposed between the two large glass substrates 11 and 12 at portions corresponding to the intersections of the first and third scribe line virtual lines 13 and 15. However, the present invention is not limited to this. For example, as in the 10th embodiment of the present invention shown in FIG. 25, pillars 7 may be formed between two large glass substrates 11 and 12, in those regions on first, second, and third scribe line virtual lines 13, 14, and 15 that do not include the intersections of the first and second scribe line virtual lines 13 and 14 and the third scribe line virtual lines 15.

Of each set of three pillars 7 and a seal member in their vicinities, the separation distance between the opposing end faces of that pair of pillars 7 that are formed on the same scribe line, or the separation distance between each of such pillars 7 and the seal member 3 in its vicinity is set to be 1.0 mm or less. Thus, as is apparent from the experimental results described above, within 0.5 mm from the pillars 7, the error in outer shape can be set to 0.02 mm or less, so the frequency of a defective outer shape can be suppressed. More specifically, for example, the two pillars 7 that are the closest on one scribe line virtual line 13 across the intersection of the first and third scribe line virtual lines 13 and 15 may be formed such that the separation distance between the two pillars 7 on this scribe line virtual line 13 is 1.0 mm or less.

11th Embodiment

Figure 26:
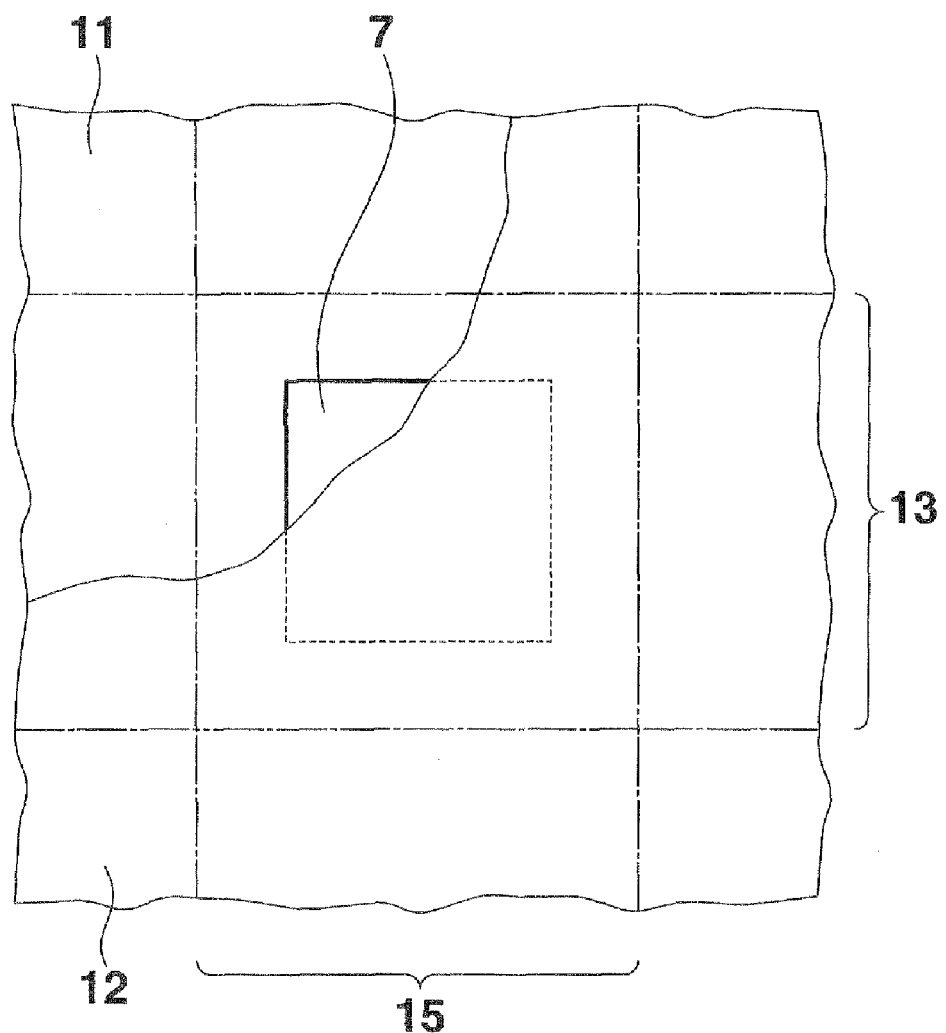
FIG. 26 is a partially cutaway plan view in which a pillar portion is partially cut away to explain an example of a manufacturing method according to the 11th embodiment of the present invention.

For example, in the first to 10th embodiments described above, cases have been described wherein the planar size of each pillar 7 is set to be larger than the planar size of the corresponding intersection of the scribe line virtual line 13 extending in the row direction and the scribe line virtual line 15 extending in the column direction. However, the present invention is not limited to this. For example, as in the 11th embodiment of the present invention shown in FIG. 26, the planar size of each pillar 7 may be set to be smaller than the planar size of the corresponding intersection of two scribe line virtual lines 13 and 15. When, e.g., each of the scribe line virtual lines 13 and 15 has a width of 50 μm, the planar size of the pillar 7 may be 30 μm×30 μm. The planar shape of the pillar 7 is not limited to a square, but can be another shape, including a rectangle, a circle, or the like, which is surrounded by an arbitrary closed curve.

Other Embodiments

In the above embodiments, cases have been described wherein the pillars 7 are made of the same material as the seal member 3 and are formed simultaneously with the seal member 3. However, the present invention is not limited to this, and the pillars 7 may be formed, separately from the seal member 3, from a material different from that of the seal member 3. For example, a seal member 3 may be formed on the upper surface of a first large glass substrate 11 from a liquid crystal less-polluting material such as a thermosetting or ultraviolet-curing epoxy-based resin by screen printing, and subsequently pillars 7 may be formed from a material such as an ultraviolet-curing polyimide-based resin by a dispenser method. For example, if pillars 7 containing an ultraviolet-curing polyimide-based resin are employed, when cutting a resultant liquid crystal display apparatus forming assembly, the pillars 7 can be easily cut along scribe lines. When the pillars are not removed but left in each liquid crystal display apparatus as a finished product, the pillars can reliably remain on each liquid crystal display apparatus in a segmented form.

The pillars 7 may be formed on the lower surface of a second large glass substrate 12. For example, pillar-shaped spacers made of a photosensitive resin such as an acrylic resin may be formed, together with pillars, on that surface of the second large glass substrate 12 that opposes the first large glass substrate 11. In this liquid crystal display apparatus in which the photospacer is to be formed on any one of the respective opposing surfaces of the first and second large glass substrates 11 and 12, when forming the photospacer, only the pillars need be simultaneously provided at portions that are described in the first to 11th embodiments described above. Thus, in addition to the effect described above, another advantage is obtained that the number of manufacturing steps of the liquid crystal display apparatus does not increase.

In the first to 11th embodiments described above, the first glass substrate (first large glass substrate) and the second glass substrate (second large glass substrate) may be interchanged. In a liquid crystal display apparatus that is manufactured in this manner, for example, the second glass substrate comprises a projection projecting from the first glass substrate. When the pillars 7 are formed on either the first or second large glass substrate 11 or 12, after segmenting the liquid crystal display apparatus forming assembly 100 into the respective devices, the pillars 7 may be removed, where necessary, by using a solvent or by mechanical grinding.

The pillars need not be provided at the intersections of the scribe line virtual lines, or in their vicinities. In this case, the pillars are desirably formed to overlap the first, second, and third scribe line virtual lines 13, 14, and 15. According to the above experimental results, the pillars are more desirably arranged at such positions that the minimal distance between adjacent pillars that are provided to overlap the corresponding scribe line virtual line is 1.0 mm or less. According to the above experimental results, the pillars need not be formed to overlap the corresponding scribe line virtual line. In this case, the pillars are desirably arranged at such positions that the minimal distance between each pillar and the corresponding scribe line virtual line is 0.5 mm or less. The pillars in this case may be formed to overlap the corresponding scribe line virtual lines, or not to overlap them.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display apparatus manufacturing method comprising:
   preparing a pair of glass substrates each including an area configured to form a plurality of liquid crystal display apparatuses thereon, wherein in each of the liquid crystal display apparatuses one of the glass substrates projects from an edge portion of the other substrate to form a projecting portion, and at least a connection terminal is formed on the projecting portion;

adhering the pair of glass substrates, with a plurality of line-shaped seal patterns and a plurality of dot-shaped pillars each including ends that respectively abut against the pair of glass substrates interposed between the pair of glass substrates, to form a liquid crystal display apparatus forming assembly; and forming, with the liquid crystal display apparatus forming assembly formed, a plurality of scribe lines that intersect each other on surfaces of the pair of glass substrates that are opposite to surfaces of the pair of glass substrates that oppose each other;

wherein each of the pillars is arranged across a projecting portion area, which corresponds to the projecting portion of one of the liquid crystal display apparatuses, and another area different from the projecting portion area, which are divided by the scribe lines; and wherein the pillars are made of a same material as the seal patterns and are formed simultaneously with the seal patterns.

2. A liquid crystal display apparatus manufacturing method comprising:

preparing a pair of glass substrates each including an area configured to form a plurality of liquid crystal display apparatuses thereon, wherein in each of the liquid crystal display apparatuses one of the glass substrates projects from an edge portion of the other substrate to form a projecting portion, and at least a connection terminal is formed on the projecting portion;

adhering the pair of glass substrates, with a plurality of line-shaped seal patterns and a plurality of dot-shaped pillars each including ends that respectively abut against the pair of glass substrates interposed between the pair of glass substrates, to form a liquid crystal display apparatus forming assembly; and forming, with the liquid crystal display apparatus forming assembly formed, a plurality of scribe lines that intersect each other on surfaces of the pair of glass substrates that are opposite to surfaces of the pair of glass substrates that oppose each other;

wherein each of the pillars is arranged across a projecting portion area, which corresponds to the projecting portion of one of the liquid crystal display apparatuses, and another area different from the projecting portion area, which are divided by the scribe lines; and wherein the pillars are made of a material that is different from a material of the seal patterns and is cut more easily than the material of the seal patterns.

3. A liquid crystal display apparatus forming assembly comprising:

a pair of glass substrates each including an area configured to form a plurality of liquid crystal display apparatuses thereon by separating the glass substrates along scribe lines, wherein in each of the liquid crystal display apparatuses one of the glass substrates projects from an edge portion of the other substrate to form a projecting portion, and at least a connection terminal is formed on the projecting portion;

a plurality of line-shaped seal patterns interposed between the pair of glass substrates; and a plurality of dot-shaped pillars each including ends that respectively abut against the pair of glass substrates;

wherein each of the pillars is arranged across a projecting portion area, which corresponds to the projecting portion of one of the liquid crystal display apparatuses, and another area different from the projecting portion area, which are divided by the scribe lines; and wherein the pillars are made of a same material as the seal patterns.

4. A liquid crystal display apparatus forming assembly comprising:

a pair of glass substrates each including an area configured to form a plurality of liquid crystal display apparatuses thereon by separating the glass substrates along scribe lines, wherein in each of the liquid crystal display apparatuses one of the glass substrates projects from an edge portion of the other substrate to form a projecting portion, and at least a connection terminal is formed on the projecting portion;

a plurality of line-shaped seal patterns interposed between the pair of glass substrates; and a plurality of dot-shaped pillars each including ends that respectively abut against the pair of glass substrates;

wherein each of the pillars is arranged across a projecting portion area, which corresponds to the projecting portion of one of the liquid crystal display apparatuses, and another area different from the projecting portion area, which are divided by the scribe lines; and wherein the pillars are made of a material that is different from a material of the seal patterns and is cut more easily than the material of the seal patterns.

* * * * *